United States Patent
Li

(10) Patent No.: US 12,531,863 B2
(45) Date of Patent: Jan. 20, 2026

(54) DEVICE CONTROL PERMISSION SETTING METHOD AND APPARATUS, AND COMPUTER DEVICE AND STORAGE MEDIUM

(71) Applicant: SHENZHEN TCL NEW TECHNOLOGY CO., LTD., Guangdong (CN)

(72) Inventor: Hui Li, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 124 days.

(21) Appl. No.: 18/579,280

(22) PCT Filed: Jul. 11, 2022

(86) PCT No.: PCT/CN2022/104872
§ 371 (c)(1),
(2) Date: Jan. 12, 2024

(87) PCT Pub. No.: WO2023/005649
PCT Pub. Date: Feb. 2, 2023

(65) Prior Publication Data
US 2024/0348612 A1 Oct. 17, 2024

(30) Foreign Application Priority Data
Jul. 26, 2021 (CN) .......................... 202110846372.6

(51) Int. Cl.
*H04L 67/12* (2022.01)
*H04L 9/40* (2022.01)
*H04L 67/08* (2022.01)

(52) U.S. Cl.
CPC .............. *H04L 63/10* (2013.01); *H04L 63/12* (2013.01); *H04L 67/08* (2013.01); *H04L 67/12* (2013.01)

(58) Field of Classification Search
CPC ..... H01L 63/10; H01L 63/101; H01L 63/102; H01L 63/104; H01L 63/105;
(Continued)

(56) References Cited

U.S. PATENT DOCUMENTS 9,380,045 B2 * 6/2016 Gilboy ................ H04W 12/088
9,985,950 B2 * 5/2018 Caterino ................. G06F 21/00
(Continued)

FOREIGN PATENT DOCUMENTS

CN 107637011 A 1/2018
CN 109428890 A * 3/2019 ............. H04L 63/06
(Continued)

OTHER PUBLICATIONS

International Search Report in International application No. PCT/CN2022/104872, mailed on Oct. 10, 2022.
(Continued)

*Primary Examiner* — Khanh Q Dinh
(74) *Attorney, Agent, or Firm* — PV IP PC; Wei Te Chung

(57) ABSTRACT

Disclosed in the present application are a device control permission setting method and apparatus, and a device and a storage medium. The method comprises: receiving and responding to a device capability request sent by a hub node that has established a connection relationship with a target controlled device; returning device capability information of the target controlled device to the hub node, so as to instruct the hub node to generate device control information; receiving the device control information sent by the hub node; and setting permission information of the hub node for the target
(Continued)

controlled device on the basis of the device control information sent by the hub node, so as to efficiently control the device.

18 Claims, 6 Drawing Sheets

(58) Field of Classification Search
CPC ... H01L 63/107; H01L 63/108; H01L 63/123; H01L 63/1408
USPC .......................................... 709/220, 224–228
See application file for complete search history.

(56) References Cited

U.S. PATENT DOCUMENTS

| | | | |
|---|---|---|---|
| 10,382,203 B1 | 8/2019 | Loladia et al. | |
| 12,388,838 B2* | 8/2025 | Singh ................... | G06F 16/285 |
| 2014/0248748 A1* | 9/2014 | Kawamura ............ | H10D 86/60 |
| | | | 438/151 |
| 2015/0288026 A1* | 10/2015 | Yamamoto ........ | H01M 10/0585 |
| | | | 429/179 |
| 2016/0088026 A1* | 3/2016 | Mohamad Abdul ...... | G06F 8/65 |
| | | | 726/1 |
| 2016/0248748 A1* | 8/2016 | Caterino ................ | H04L 63/10 |
| 2016/0301695 A1 | 10/2016 | Trivelpiece et al. | |
| 2018/0020329 A1* | 1/2018 | Smith .................... | H04W 4/08 |
| 2018/0034655 A1* | 2/2018 | Christopher ............ | G06F 3/048 |
| 2018/0063145 A1 | 3/2018 | Cayton et al. | |
| 2019/0158975 A1* | 5/2019 | Petersen ................ | H04W 4/70 |
| 2019/0215319 A1* | 7/2019 | Hu ........................ | G06F 21/30 |
| 2019/0373472 A1* | 12/2019 | Smith .................... | H04W 4/38 |
| 2020/0059881 A1* | 2/2020 | Gupta ................ | H04W 12/009 |
| 2020/0322543 A1* | 10/2020 | Onda ................... | H04N 23/651 |
| 2020/0327231 A1* | 10/2020 | Smith ................... | G06F 21/33 |
| 2021/0233672 A1* | 7/2021 | Patil ........................ | H04L 63/00 |
| 2021/0392171 A1* | 12/2021 | Srinivas ................. | G06N 5/047 |
| 2023/0001034 A1* | 1/2023 | Baarman ................... | A61L 2/10 |
| 2023/0011728 A1* | 1/2023 | Baarman ............... | A61L 2/0047 |
| 2024/0012937 A1* | 1/2024 | Park ........................ | G05B 15/02 |

FOREIGN PATENT DOCUMENTS

| | | | | |
|---|---|---|---|---|
| CN | 109714760 | A | 5/2019 | |
| CN | 111510425 | A | 8/2020 | |
| CN | 111526112 | A | 8/2020 | |
| CN | 111787540 | A | 10/2020 | |
| CN | 112198805 | A | 1/2021 | |
| CN | 112466303 | A | 3/2021 | |
| CN | 112492023 | A | 3/2021 | |
| CN | 112637221 | A | 4/2021 | |
| CN | 113596013 | A | 11/2021 | |
| KR | 101688812 | B1 | 12/2016 | |
| KR | 20220123683 | A | * 9/2022 | ............... A61L 9/20 |

OTHER PUBLICATIONS

Written Opinion of the International Search Authority in International application No. PCT/CN2022/104872, mailed on Oct. 10, 2022.
Chinese Office Action issued in corresponding Chinese Patent Application No. 202110846372.6 dated Nov. 28, 2022, pp. 1-13.
Computers & Electrical Engineering, Jan. 29, 2021 <Identification of trusted IoT devices for secure delegation>, whole documents.
电力工程技术, Nov. 28, 2020, 基于侧链技术的电力物联网跨域认证研究, whole documents.
Notification to Grant Patent Right for Invention issued in corresponding Chinese Patent Application No. 202110846372.6 dated Dec. 12, 2023, pp. 1-5.

* cited by examiner

DEVICE CONTROL PERMISSION SETTING METHOD AND APPARATUS, AND COMPUTER DEVICE AND STORAGE MEDIUM

CROSS-REFERENCE TO RELATED APPLICATION

This application is a US national phase application based upon an International Application No. PCT/CN2022/104872, filed on Jul. 11, 2022, which claims priority to Chinese Patent application No. 202110846372.6, entitled "DEVICE CONTROL PERMISSION SETTING METHOD AND APPARATUS, AND COMPUTER DEVICE AND STORAGE MEDIUM", filed on Jul. 26, 2021, the disclosure of which is incorporated herein by reference in its entirety.

TECHNICAL FIELD

The present application relates to the field of Internet technologies, and more particularly to a method and apparatus for setting a device control authority, a computer device, and a storage medium.

BACKGROUND

The Internet of Things (IoT), i.e., Internet of Everything, is a huge network formed by combining various information sensing devices with a network, so that interconnection and intercommunication between people, machines, and objects can be realized at any time, anywhere. An Internet of Things device is composed of a hardware and a software system thereon, and device control of the Internet of Things device can be realized by setting a device control authority for the Internet of Things device.

SUMMARY

Technical Problems

In the research and practice of the related art, the inventors of the present application have found nowadays that implementation of the interconnection and intercommunication in the same Internet of Things system has a mature and wide application. However, if it is expected to implement the interconnection and intercommunication across Internet of Things systems, for example, when an Internet of Things device is controlled by a hub node of a different Internet of Things system than an Internet of Things system to which the Internet of Things device belongs, a relatively high cost is required, so that the interconnection and intercommunication between the hub device and the Internet of Things device still needs to be improved in an application scenario across the Internet of Things systems.

Solutions to Problems

Technical Solutions

Embodiments of the present application provide a method and apparatus for setting a device control authority, a computer device, and a storage medium, which can implement a device control authority for a target controlled device with a hub node across Internet of Things systems, so as to enable the hub node to efficiently perform device control of the target controlled device.

An embodiment of the present application provides a method for setting a device control authority, including:
 receiving a device capability request transmitted by a hub node that has established a connection relationship with a target controlled device, where the target controlled device and the hub node belong to different Internet of Things systems;
 responsive to the device capability request, returning device capability information of the target controlled device to the hub node, where the device capability information is configured to instruct the hub node to generate device control information for the target controlled device;
 receiving device control information transmitted by the hub node; and
 setting authority information of the hub node for the target controlled device based on the device control information.

Correspondingly, another embodiment of the present application provides another method for setting a device control authority, including:
 obtaining device capability information of a target controlled device that has established a connection relationship with a hub node;
 generating device control information of the hub node for the target controlled device based on the device capability information; and
 transmitting the device control information to the target controlled device, where the device control information is configured to instruct the target controlled device to set a control authority, the control authority being a device control authority of the hub node for the target controlled device.

Correspondingly, yet another embodiment of the present application provides an apparatus for setting a device control authority, including:
 a request receiving unit for receiving a device capability request transmitted by a hub node that has established a connection relationship with a target controlled device, where the target controlled device and the hub node belong to different Internet of Things systems;
 a response unit for, responsive to the device capability request, returning device capability information of the target controlled device to the hub node, where the device capability information is configured to instruct the hub node to generate device control information for the target controlled device;
 an information receiving unit for receiving device control information transmitted by the hub node; and
 An authority setting unit for setting authority information of the hub node for the target controlled device based on the device control information.

In some embodiments, the hub node includes a configuration device, the request receiving unit includes
 a request receiving subunit for receiving a device capability request transmitted by the configuration device that has established a connection relationship with the target controlled device, and
 the response unit includes
 a response subunit for, responsive to the device capability request, returning device capability information of the target controlled device to the configuration device.

In some embodiments, the request receiving unit includes:
 a first connection establishing subunit for establishing a connection relationship between the target controlled device and the hub node; and a capability receiving subunit for receiving the device capability request transmitted by the hub node based on the connection relationship.

In some embodiments, the first connection establishing subunit is configured to:

receive connection interrogation information transmitted by the hub node; and if information format of the connection interrogation information meets a preset interrogation format, establish a connection relationship between the target controlled device and the hub node.

In some embodiments, the first connection establishing subunit is specifically configured to:

generate interrogation response information of the connection interrogation information, where the interrogation response information includes device information of the target controlled device; and transmit the interrogation response information to the hub node to establish a connection relationship between the target controlled device and the hub node based on the device information.

In some embodiments, the capability receiving subunit is configured to:

authenticate the hub node based on the connection relationship; and if the authentication is passed, receive the device capability request transmitted by the hub node.

In some embodiments, the capability receiving subunit is specifically configured to:

perform certificate authentication or key authentication on the hub node based on the connection relationship.

In some embodiments, the response unit includes:

a capability determining subunit for determining device capability information of the target controlled device; and a capability returning subunit for, responsive to the device capability request, returning device capability information of the target controlled device to the hub node to trigger the hub node to generate device control information for the target controlled device based on the device capability information.

In some embodiments, the hub node includes a configuration device and an access management device, where the configuration device has established a connection relationship with the target controlled device; and the information receiving unit includes:

a second connection establishing subunit for establishing an access connection relationship with the access management device via the configuration device; and a control information receiving subunit for receiving device control information transmitted by the access management device based on the access connection relationship.

In some embodiments, the second connection establishing subunit is configured to:

obtain communication address information of the access management device via the configuration device; and establish an access connection relationship with the access management device based on the communication address information.

In some embodiments, the second connection establishing subunit is specifically configured to:

obtain communication address information of the access management device transmitted by the configuration device.

In some embodiments, the second connection establishing subunit is specifically obtain device verification information of the access management device transmitted by the configuration device, where the device verification information transmitted by the configuration device is configured to verify the access management device; and obtain communication address information transmitted by the access management device based on the device verification information transmitted by the configuration device.

In some embodiments, the second connection establishing subunit is specifically configured to:

obtain device verification information and communication address information transmitted by each of candidate access management devices; verify the device verification information of the candidate access management device based on the device verification information transmitted by the configuration device; if the verification is passed, determine that the communication address information transmitted by the candidate access management device is communication address information transmitted by the access management device.

In some embodiments, the second connection establishing subunit is specifically configured to:

generate device finding information to transmit the device finding information to candidate access management devices; and obtain response information generated by each of the candidate access management devices based on the device finding information, where the response information includes device verification information and communication address information of the candidate access management device.

In some embodiments, the control information receiving subunit is configured to:

authenticate the access management device based on the access connection relationship; and if the authentication is passed, receive device control information transmitted by the access management device.

In some embodiments, the control information receiving subunit is specifically configured to:

obtain authentication verification information of the access management device transmitted by the configuration device; and authenticate the access management device with the authentication verification information.

In some embodiments, the control information receiving subunit is specifically obtain device authentication information transmitted by the access management device; and verify the device authentication information with the authentication verification information to authenticate the access management device.

In some embodiments, the control information receiving subunit is specifically configured to:

generate an authentication request to transmit the authentication request to the access management device; and obtain device authentication information returned by the access management device responsive to the authentication request, where the device authentication information is generated by the access authentication device, and the access authentication device and the access management device belong to the same Internet of things system.

In some embodiments, the control information receiving subunit is specifically configured to:

if the authentication is passed, transmit device information of the target controlled device to the access management device to perform device registration with the access management device; and receive device control information transmitted by the access management device based on a registration result.

In some embodiments, the hub node includes a control device, and the authority setting unit includes:
a first authority setting subunit for setting authority information of the control device for the target controlled device based on the device control information.

In some embodiments, the hub node includes an access management device, and the authority setting unit includes:
a second authority setting subunit for setting an information changing authority of the access management device for the target controlled device based on the device control information, where the information changing authority represents a changing authority of the access management device for the device control information stored in the target controlled device.

In some embodiments, the device control information includes a system identification of a target Internet of Things system and an object identification of a device control object, where the target Internet of Things system is an Internet of Things system to which the hub node belongs, and the device control object is an object that controls the target controlled device via the hub node; and the authority setting unit includes:
a third authority setting subunit for setting a device control authority of the device control object in the target Internet of Things system for the target controlled device based on the system identification and the object identification.

In some embodiments, the device control information further includes object attribute information of the device control object; and the third authority setting subunit is configured to:
determine a service calling authority of the device control object to the target controlled device based on the object attribute information, where the service calling authority is a calling authority of the device control object for a service provided by the target controlled device, and the service provided by the target controlled device is determined based on the device capability information of the target controlled device; and
set a device control authority of the device control object in the target Internet of Things system for the target controlled device based on the service calling authority.

In some embodiments, the third authority setting subunit is specifically configured to:
if the object attribute information indicates that the device control object has an information changing authority for the target controlled device, setting a device control authority of the device control object in the target Internet of Things system for the target controlled device based on the information changing authority and the service calling authority, where the information changing authority represents a changing authority of the device control object for the device control information stored in the target controlled device.

In some embodiments, the apparatus for setting the device control authority further includes:
an instruction receiving unit for receiving a device control instruction transmitted by the hub node, where the device control instruction is used for the hub node to perform device control for the target controlled device; and
an operation execution unit for executing an operation corresponding to the device control instruction.

In some embodiments, the instruction receiving unit includes:
a first instruction receiving subunit for receiving a device control instruction transmitted by a first cloud server paired with the target controlled device, where the device control instruction is an instruction transmitted by the hub node to the first cloud server via a second cloud server, and the second cloud server is a cloud server paired with the hub node.

In some embodiments, the instruction receiving unit includes:
a second instruction receiving subunit for receiving a device control instruction transmitted by a second cloud server paired with the hub node, where the device control instruction is an instruction transmitted by the hub node to the second cloud server.

In some embodiments, the instruction receiving unit includes:
a second connection establishing subunit for establishing a control connection relationship with the hub node, where the control connection relationship is used for the hub node to perform device control for the target controlled device; and
a third instruction receiving subunit for receiving a device control instruction transmitted by the hub node based on the control connection relationship.

In some embodiments, the device control information includes an object identification of a device control object and connection key information corresponding to the device control object, where the device control object is an object that controls the target controlled device via the hub node; and the second connection establishing subunit is configured to:
establish a control connection relationship with the hub node based on the object identification and the connection key information.

In some embodiments, the device control information includes a target system identification of a target Internet of Things system and a target device identification allocated by the target Internet of Things system for the target controlled device, where the target Internet of Things system is an Internet of Things system to which the hub node belongs; and the second connection establishing subunit is specifically configured to:
obtaining a control connection request of a hub node, where the control connection request includes a hub system identification, and the hub system identification is a device identification of an Internet of things system to which the hub node belongs; and if the hub system identification matches the target system identification, establishing a control connection relationship with the hub node based on the target device identification, the object identification, and the connection key information.

In some embodiments, the second connection establishing subunit is specifically
generating device connection response information of the control connection request, where the device connection response information includes the target device identification; and transmitting the device connection response information to the hub node to establish a control connection relationship with the hub node based on the object identification and the connection key information.

In some embodiments, the device control instruction includes an information changing instruction, and the operation execution unit includes:

an object determining subunit for determining a device control object corresponding to the device control instruction; and an operation execution subunit for executing an information changing operation corresponding to the information changing instruction if the device control object has an information changing authority for the target controlled device.

Correspondingly, yet another embodiment of the present application provides an apparatus for setting a device control authority, including:

capability obtaining unit for obtaining device capability information of a target controlled device that has established a connection relationship with a hub node;

information generating unit for generating device control information of the hub node for the target controlled device based on the device capability information; and information transmitting unit for transmitting the device control information to the target controlled device, where the device control information is configured to instruct the target controlled device to set a control authority, the control authority being a device control authority of the hub node for the target controlled device.

In some embodiments, the hub node includes a configuration device, and the capability obtaining unit includes:

a first capability obtaining subunit for triggering the configuration device to obtain device capability information of the target controlled device that has established a connection relationship with the configuration device.

In some embodiments, the capability obtaining unit includes:

a first connection establishing subunit for establishing a connection relationship between the hub node and the target controlled device, where the hub node and the target controlled device belong to different Internet of Things systems.

a second capability obtaining subunit for obtaining device capability information of the target controlled device based on the connection relationship.

In some embodiments, the first connection establishing subunit is configured to:

generating connection interrogation information meeting a preset interrogation format; transmitting the connection interrogation information to the target controlled device to receive interrogation response information transmitted by the target controlled device based on the connection interrogation information, where the interrogation response information includes device information of the target controlled device; and establishing a connection relationship between the hub node and the target controlled device based on the device information.

In some embodiments, the first connection establishing subunit is specifically configured to:

obtaining connection verification information of the target controlled device based on the device information; and establishing a connection relationship between the hub node and the target controlled device based on the connection verification information.

In some embodiments, the first connection establishing subunit is specifically configured to:

obtaining connection verification information of the target controlled device responsive to an information inputting operation for the hub node.

In some embodiments, the first connection establishing subunit is specifically configured to:

obtaining connection verification information transmitted by a target client, where the target client is a client matching the hub node, and the connection verification information is connection verification information corresponding to the target controlled device.

In some embodiments, the second capability obtaining subunit is configured to:

generate a device capability request for the target controlled device to transmit the device capability request to the target controlled device based on the connection relationship;

and receive device capability information returned by the target controlled device based on the device capability request.

In some embodiments, the second capability obtaining subunit is specifically authenticate the target controlled device based on the connection relationship; and if the authentication is passed, transmit the device capability request to the target controlled device.

In some embodiments, the second capability obtaining subunit is specifically configured to:

perform certificate authentication or key authentication on the target controlled device based on the connection relationship.

In some embodiments, the hub node includes an access management device, and the information generating unit includes:

a first information generating subunit for triggering the access management device to generate device control information of the access management device to the target controlled device based on the device capability information to transmit the device control information to the target controlled device.

In some embodiments, the information generating unit includes:

an object determining subunit for determining a device control object of the hub node, where the device control object is an object that controls the target controlled device via the hub node;

a second information generating subunit for generating device control information of the device control object in a target Internet of Things system for the target controlled device based on the device capability information, where the target Internet of Things system is an Internet of Things system to which the hub node belongs.

In some embodiments, the second information generating subunit is configured to:

determine a service provided by the target controlled device based on the device capability information; determine service accessing information of the device control object to the service; and generate device control information of the device control object in a target Internet of Things system for the target controlled device based on the service accessing information.

In some embodiments, the second information generating subunit is specifically configured to:

determine object attribute information of the device control object; and generate device control information of the device control object in the target Internet of Things system for the target controlled device based on the object attribute information.

In some embodiments, the hub node includes a configuration device and an access management device, where the configuration device has established a connection relationship with the target controlled device; and the information transmitting unit includes:
    a second connection establishing subunit for establishing an access connection relationship between the access management device and the target controlled device via the configuration device; and
    an information transmitting subunit for transmitting device control information to the target controlled device based on the access connection relationship.

In some embodiments, the second connection establishing subunit is configured to:
    transmit communication address information of the access management device to the target controlled device via the configuration device; and establish an access connection relationship between the access management device and the target controlled device based on the communication address information.

In some embodiments, the second connection establishing subunit is specifically configured to:
    obtain communication address information of the access management device via the configuration device; and trigger the configuration device to transmit the communication address information to the target controlled device.

In some embodiments, the second connection establishing subunit is specifically configured to:
    transmit device verification information of the access management device to the target controlled device via the configuration device, where the device verification information is used for the target controlled device to verify the access management device; and transmit communication address information of the access management device to the target controlled device based on the device verification information.

In some embodiments, the second connection establishing subunit is specifically configured to:
    receive device finding information transmitted by the target controlled device based on the device verification information; and generate response information for the device finding information to transmit the response information to the target controlled device, where the response information includes connection verification information and communication address information of the access management device.

In some embodiments, the information transmitting subunit is configured to:
    authenticate the target controlled device based on the access connection relationship; and if the authentication is passed, transmit the device control information to the target controlled device.

In some embodiments, the hub node further includes an access authentication device, and the information transmitting subunit is specifically configured to:
    authenticating the target controlled device via the access authentication device.

In some embodiments, before the transmitting the device control information to the target controlled device, the information transmitting subunit is further configured to:
    determine device authentication information of the access management device, where the device authentication information is used for the target controlled device to authenticate the access management device; and transmit the device authentication information to the target controlled device.

In some embodiments, the information transmitting subunit is specifically configured to:
    obtain an authentication request transmitted by the target controlled device; and
    generate device authentication information of the access management device based on the authentication request.

In some embodiments, the hub node further includes an access authentication device, and the information transmitting subunit is further specifically configured to:
    transmit the authentication request to the access authentication device; and trigger the access authentication device to generate device authentication information of the access management device based on the authentication request.

In some embodiments, the information transmitting subunit is specifically configured to:
    if the authentication is passed, receive device information transmitted by the target controlled device to perform device registration with the target controlled device; and transmit device control information to the target controlled device based on a registration result.

In some embodiments, the apparatus for setting the device control authority further includes:
    an instruction transmitting unit for transmitting a device control instruction to the target controlled device to perform device control for the target controlled device via the device control instruction.

In some embodiments, the instruction transmitting unit includes:
    a first instruction transmitting subunit for transmitting a device control instruction to a second cloud server to transmit the device control instruction to the target controlled device via the second cloud server, where the second cloud server is a cloud server paired with the hub node.

In some embodiments, the instruction transmitting unit includes:
    a second instruction transmitting subunit for transmitting a device control instruction to a second cloud server to transmit the device control instruction to a first cloud server via the second cloud server and transmit the device control instruction to the target controlled device via the first cloud server, where the second cloud server is a cloud server paired with the hub node, and the first cloud server is a cloud server paired with the target controlled device.

In some embodiments, the instruction transmitting unit includes:
    a third connection establishing subunit for establishing a control connection relationship with the target controlled device, where the control connection relationship is used for the hub node to perform device control for the target controlled device; and
    a third instruction transmitting subunit for transmitting device control instruction to the target controlled device based on the control connection relationship.

In some embodiments, the device control information includes an object identification of a device control object and connection key information corresponding to the device control object, where the device control object is an object that controls the target controlled device via the hub node; and the third connection establishing subunit is configured to:
    establish a connection relationship with the target controlled device based on the object identification and the connection key information.

In some embodiments, the device control information includes a target system identification of a target Internet of Things system and a target device identification allocated by the target Internet of Things system for the target controlled device, where the target Internet of Things system is an Internet of Things system to which the hub node belongs; and the third connection establishing subunit is specifically configured to:

generate a control connection request to transmit the control connection request to the target controlled device, where the control connection request includes the target system identification; receive control connection response information transmitted by the target controlled device, where the control connection response information includes a first device identification corresponding to the target controlled device; and establishing a control connection relationship with the target controlled device based on the object identification and the connection key information if the first device identification matches the target device identification.

In some embodiments, the third instruction transmitting subunit is configured to:

determine a device control object of the target controlled device; if the device control object has an information changing authority for the target controlled device, generating a device control instruction based on the information changing authority; and transmitting the device control instruction to the target controlled device.

Correspondingly, another embodiment of the present application further provides a storage medium on which a computer program is stored, where the computer program, when executed by a processor, implements the method for setting the device control authority as shown in any one of the embodiments of the present application.

Correspondingly, another embodiment of the present application further provides a computer device, including: a memory, a processor, and a computer program stored on the memory and operable on the processor, where the computer program, when executed by the processor, implements the method for setting the device control authority as shown in any one of the embodiments of the present application.

BENEFICIAL EFFECTS OF INVENTION

Beneficial Effects

The embodiments of the present application can receive a device capability request transmitted by a hub node that has established a connection relationship with a target controlled device, where the target controlled device and the hub node belong to different Internet of Things systems; responsive to the device capability request, return device capability information of the target controlled device to the hub node, where the device capability information is configured to instruct the hub node to generate device control information for the target controlled device; receive device control information transmitted by the hub node; and set authority information of the hub node for the target controlled device based on the device control information.

The solution can enable the hub node of the different Internet of Things system than the Internet of Things system to which the target controlled device belongs to set the device control authority of the hub node for the target controlled device, thereby implementing device control in a scenario across the Internet of Things systems. Specifically, the solution establishes a connection relationship between the target controlled device and the hub node, so that the hub node can obtain the device capability information of the target controlled device based on the connection relationship, generate device control information for setting the authority information, and set the device control authority of the hub node for the target controlled device with the device control information. As such, the solution can support that the target controlled device is controlled by a local hub device such as a third-party application, an intelligent sound box, a gateway, an intelligent television, or a router, so that the interconnection and intercommunication between the target controlled devices across the Internet of Things systems are improved.

In addition, compared with the protocol interconnection or standardization between one cloud and another cloud or between an end and one cloud, the solution avoids the problem that the performance and the stability of the protocol interconnection or standardization between one cloud and another cloud are not high due to the long data link, and improves the problem that the device manufacturer of the protocol interconnection or standardization between an end and one cloud is less motivated and difficult to push because the Internet of Things device cannot access the cloud of the device manufacturer. Therefore, the solution can further improve the interconnection and intercommunication between the Internet of Things devices across the Internet of Things systems without affecting the Internet of Things devices being connected to the cloud of the device manufacturer at a low cost.

BRIEF DESCRIPTION OF THE DRAWINGS

Description of the Drawings

In order to more clearly illustrate the technical solutions in embodiments of the present application, the accompanying drawings depicted in the description of the embodiments will be briefly described below. It will be apparent that the accompanying drawings in the following description are merely some embodiments of the present application, and other drawings may be obtained from these drawings without creative effort by those skilled in the art.

Figure 1:
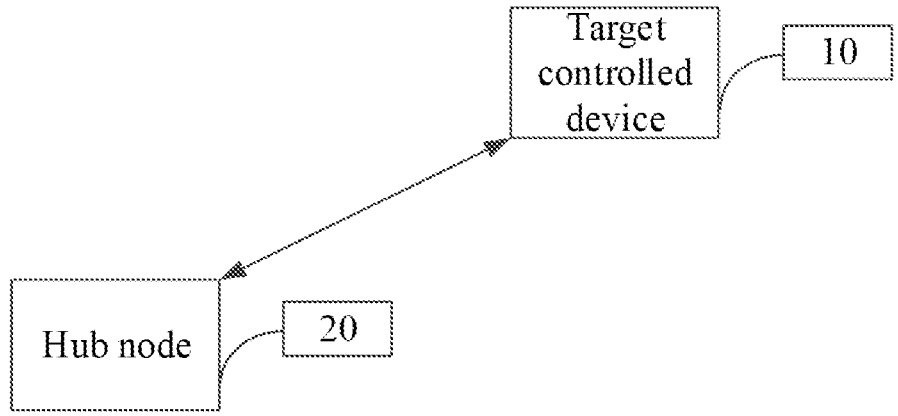

FIG. 1 is a schematic diagram of a scenario of a method for setting a device control authority according to some embodiments of the present application.

Figure 2:
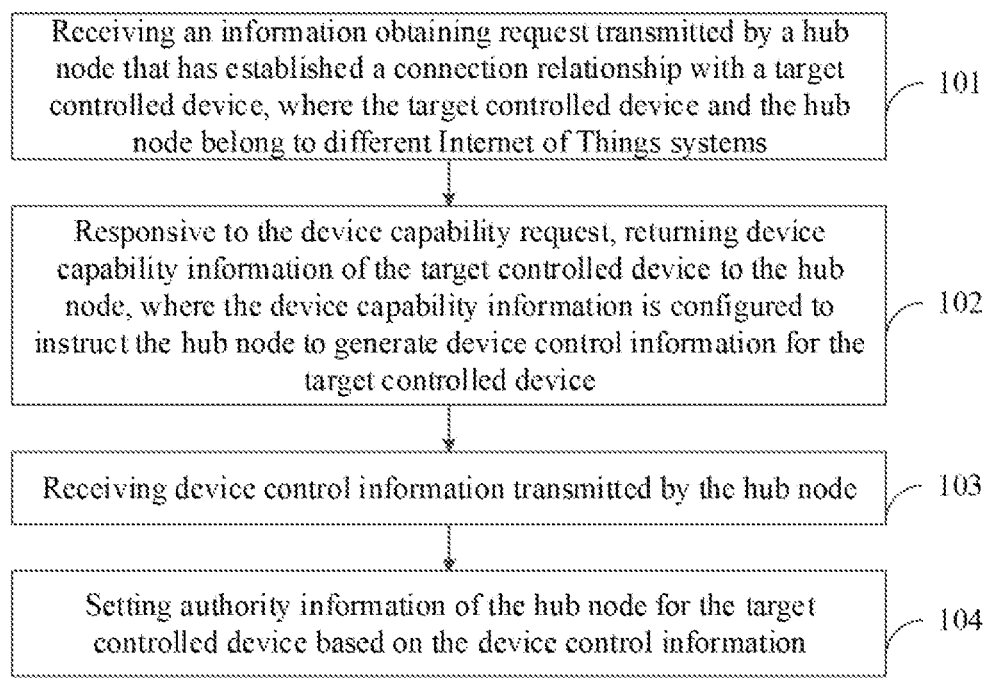

FIG. 2 is a flow diagram of a method for setting a device control authority according to some embodiments of the present application.

Figure 3:
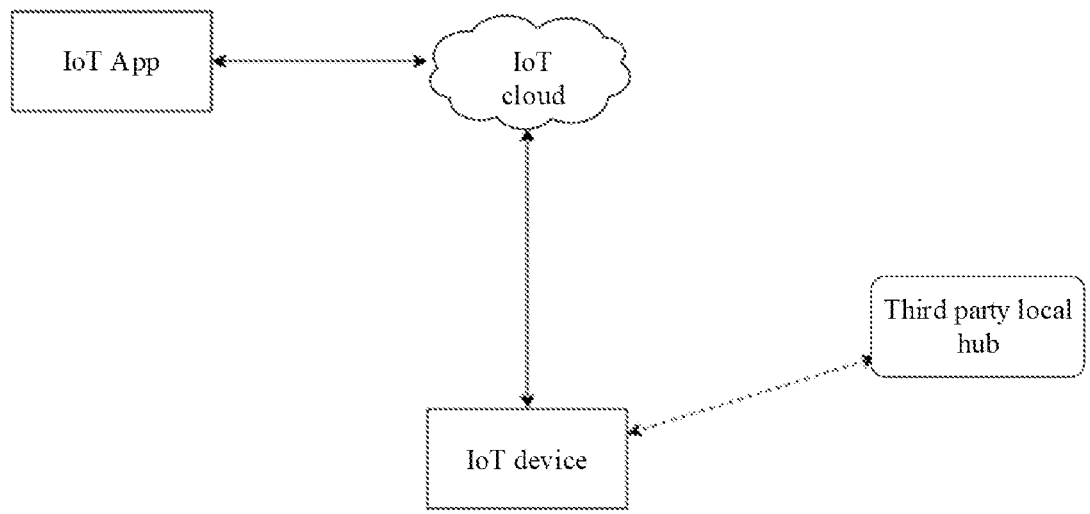

FIG. 3 is an interactive schematic diagram of a method for setting a device control authority according to some embodiments of the present application.

Figure 4:
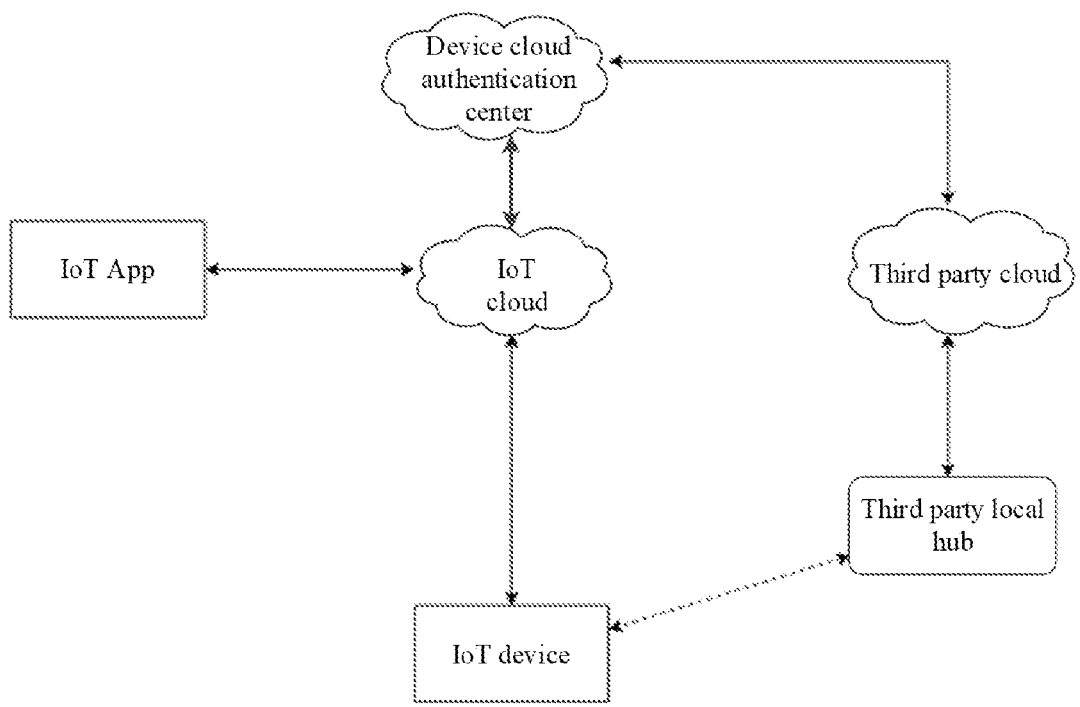

FIG. 4 is another interactive schematic diagram of a method for setting a device control authority according to some embodiments of the present application.

Figure 5:
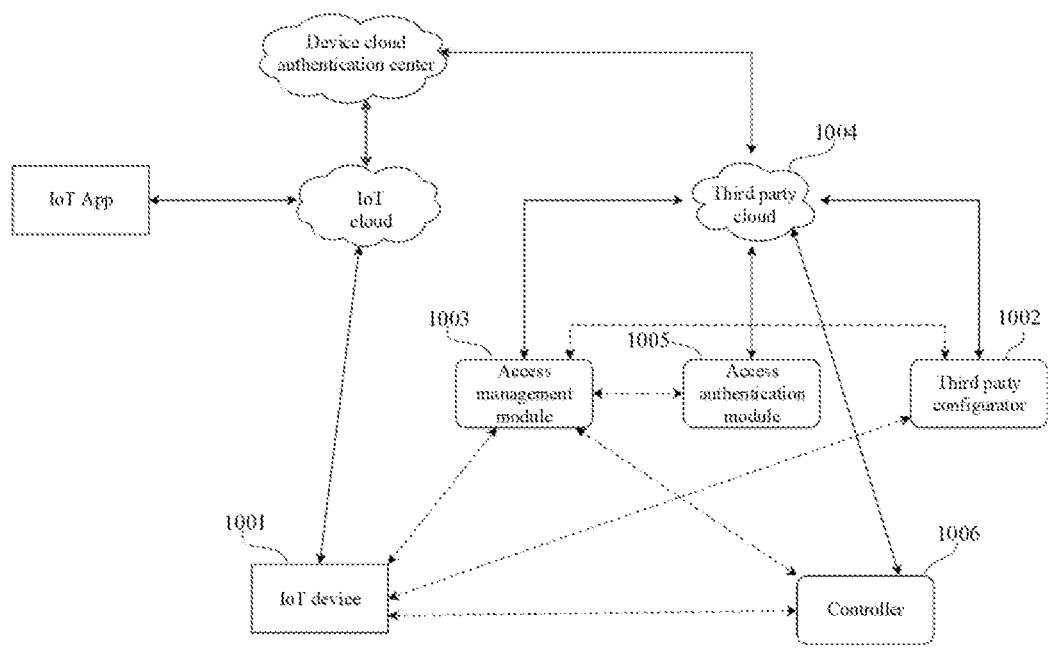

FIG. 5 is another interactive schematic diagram of a method for setting a device control authority according to some embodiments of the present application.

Figure 6:
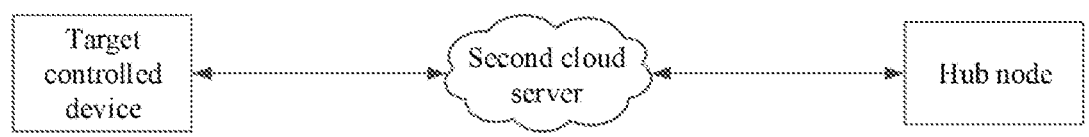

FIG. 6 is another interactive schematic diagram of a method for setting a device control authority according to some embodiments of the present application.

Figure 7:

FIG. 7 is another interactive schematic diagram of a method for setting a device control authority according to some embodiments of the present application.

Figure 8:

FIG. 8 is another interactive schematic diagram of a method for setting a device control authority according to some embodiments of the present application.

Figure 9:
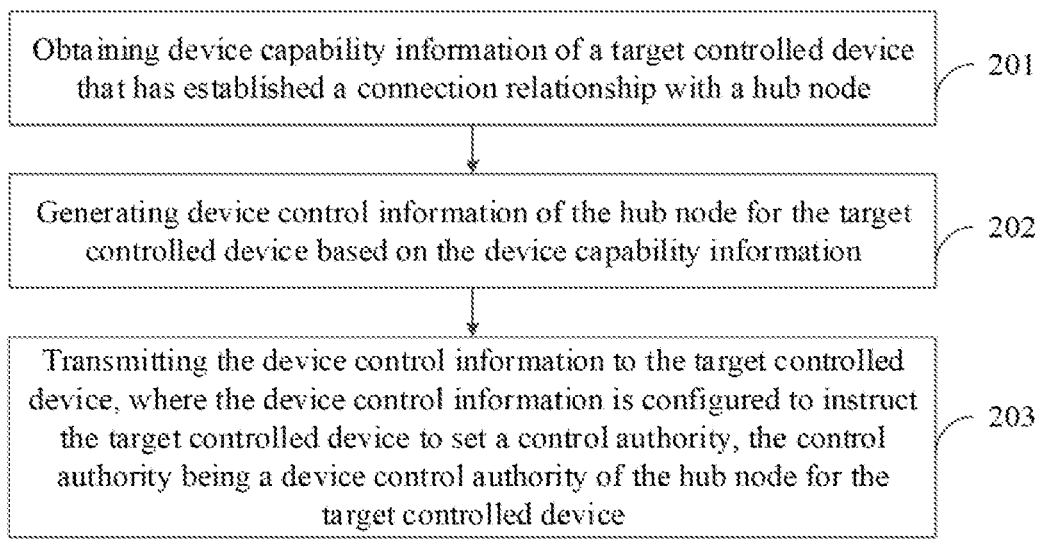

FIG. 9 is another flow diagram of a method for setting a device control authority according to some embodiments of the present application.

Figure 10:
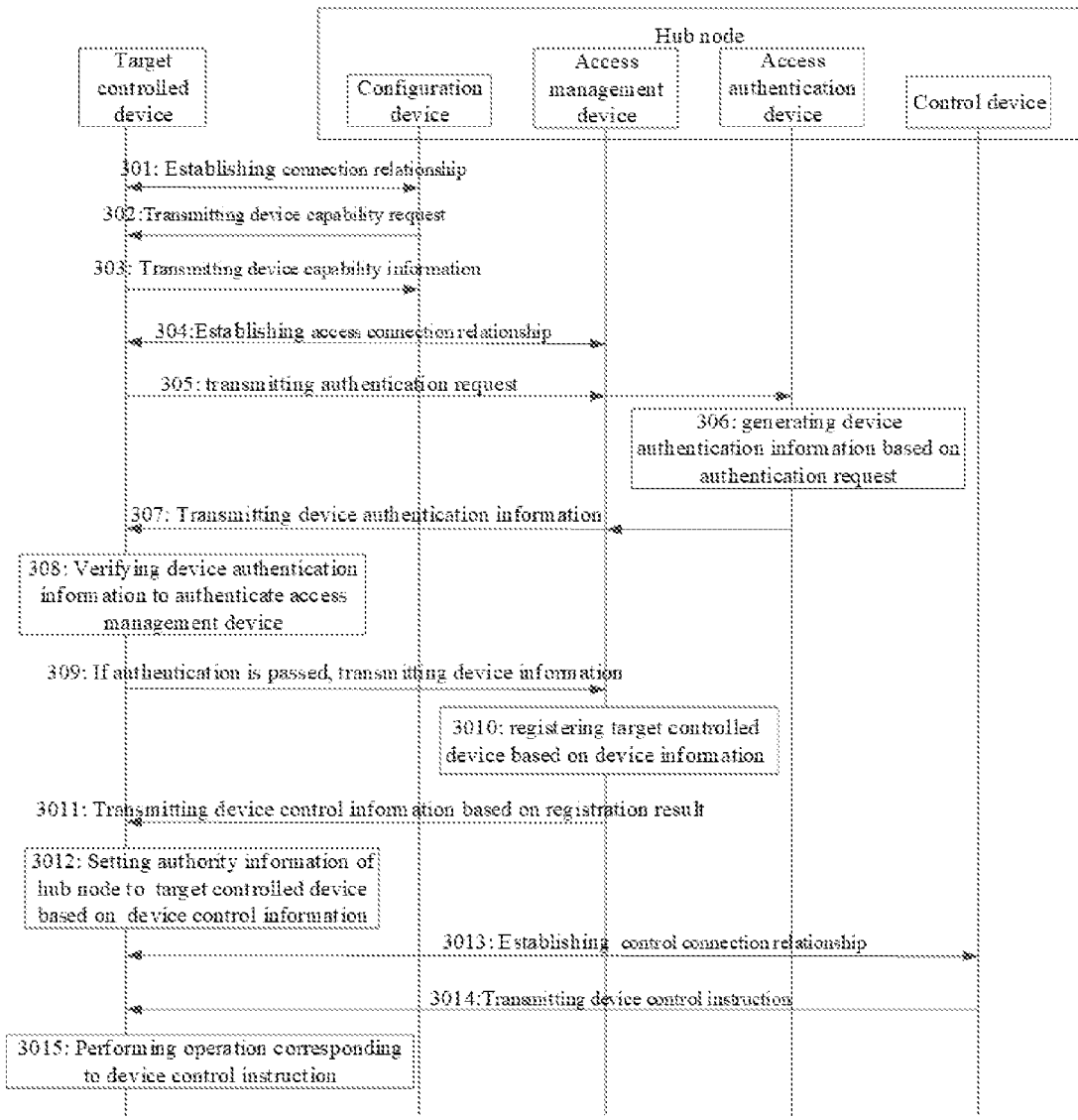

FIG. 10 is another interactive schematic diagram of a method for setting a device control authority according to some embodiments of the present application.

Figure 11:
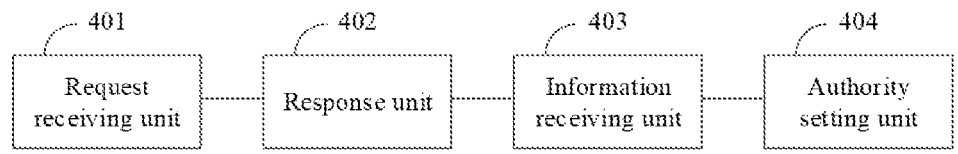

FIG. 11 is a schematic structural diagram of an apparatus for setting a device control authority according to some embodiments of the present application.

Figure 12:
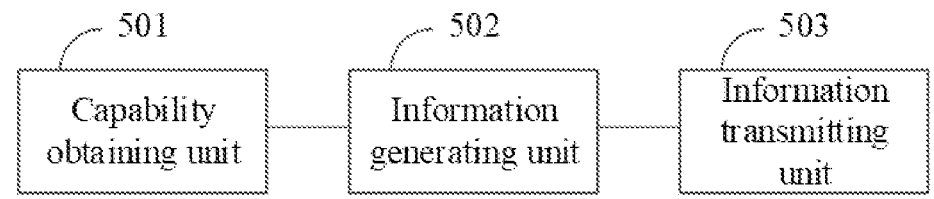

FIG. 12 is another schematic structural diagram of an apparatus for setting a device control authority according to some embodiments of the present application.

Figure 13:
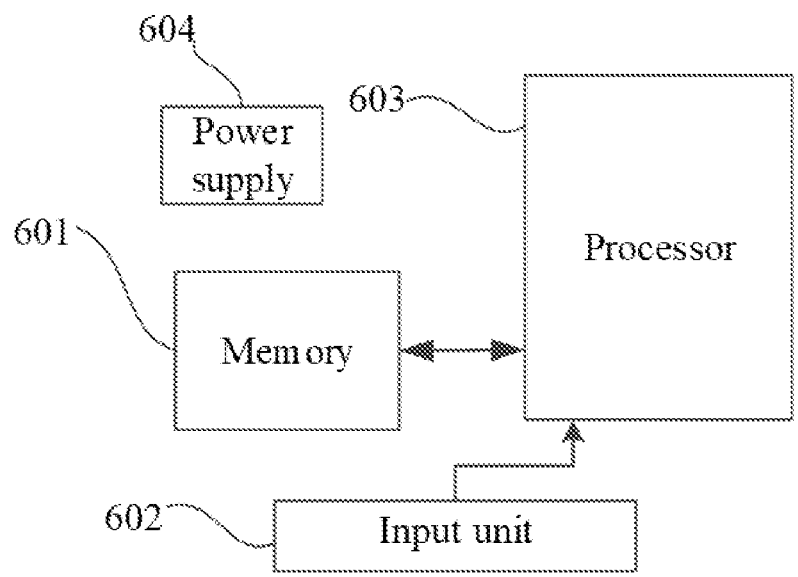

FIG. 13 is a schematic structural diagram of a computer device according to some embodiments of the present application.

EMBODIMENTS OF INVENTION

Detailed Description

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

Embodiments of the present application provide a method and apparatus for setting a device control authority, a computer device, and a storage medium and the like, which can improve interconnection and intercommunication between Internet of Things devices across Internet of Things systems.

Please refer to FIG. 1, a system architecture for a method for setting a device control authority provided in the present application is described first.

Referring to FIG. 1, an embodiment of the present application provides a system for setting a device control authority, including at least a target controlled device 10, a hub node 20, and the like. The target controlled device 10 is connected to the hub node 20 via a network, such as, a wired or wireless network. It should be noted that the target controlled device 10 and the hub node 20 in the present application belong to different Internet of Things systems. That is, the target controlled device 10 and the hub node 20 are Internet of Things objects in the different Internet of Things systems, respectively. In the present application, the Internet of Things system may also be referred to as an association of Things system, which have equivalent concepts.

The Internet of Things (IoT) refers to collecting in real time any object or process to be monitored, connected, or interacted by various devices and technologies, such as various information sensors, radio frequency identification technologies, global positioning systems, infrared sensors, or laser scanners, collecting various required information such as sound, light, heat, electricity, mechanics, chemistry, biology, or location of the object and process, realizing ubiquitous connection between one object and another object or between an object and human via various possible network access, and realizing intelligent sensing, identification, and management of the object and the process. The Internet of Things is an information carrier based on the Internet, as well as conventional telecommunications networks, etc., which enables all ordinary physical objects that can be independently addressed to form an interconnected and intercommunicated network.

An Internet of Things device refers to a device having a sensor detection function or an access device having an intelligent function in the Internet of Things. For example, a device supporting a temperature detecting sensor or a home intelligent device (which may be an intelligent home system composed of multiple devices) may simultaneously support certain control functions, such as a restart, firmware upgrade, and the like. For example, the Internet of Things device may include an intelligent sound box, an intelligent television, an intelligent air conditioner, an intelligent refrigerator, an intelligent water heater, a gateway, a router, a floor sweeping robot, or the like. In particular, the Internet of Things device may be a terminal device such as a mobile phone, a tablet computer, or a notebook computer. The terminal device may have an Internet of Things client running thereon. As an example, the client may include a browser application (also referred to as a Web application), an Application (APP), an applet, and the like.

The Internet of Things system is an integrated system platform for realizing interconnection and intercommunication, and Internet of Things objects belonging to the same Internet of Things system can interact by following a data interaction criterion of the Internet of Things system. For example, compared with cross Internet of Things systems, for an APP, a cloud server, an Internet of Things device, a service, and the like in the same Internet of Things system, they may have related authority of data interaction because they are Internet of Things objects in the same Internet of Things system, so that the Internet of Things objects in the same Internet of Things system may perform data interaction more quickly.

In a practical application, Internet of Things objects belonging to the same Internet of Things system may be referred to as Internet of Things object belonging to the same Internet of Things ecology, or Internet of Things objects belonging to the same ecology. For example, for an Internet of Things system including an application, a cloud server, an Internet of Things device, a service, and the like constructed by an organization subject, an Internet of Things object in the Internet of Things system may be considered as an Internet of Things object in an Internet of Things ecology constructed by the organization subject. The organization subject may be a single subject, for example, a manufacturer, a factory, a brand, or the like. The organization subject may be an organization formed by a plurality of subjects, for example, an alliance organization formed by negotiation of a plurality of manufacturers.

For example, the target controlled device 10 and the hub node 20 in the architecture shown in FIG. 1 do not belong to the same Internet of Things system, but the architecture shown in FIG. 1 may further include other Internet of Things objects belonging to the same Internet of Things system as the target controlled device 10, such as a cloud server and a client belonging to the same Internet of Things system as the target controlled device 10. Illustratively, FIG. 3 illustrates a diagram showing another embodiment of a setting system according to the present application. The setting system shown in FIG. 3 includes other devices belonging to the same Internet of Things system as the target controlled device 10. Specifically, referring to FIG. 3, the target controlled device 10 is the IoT device shown in FIG. 3, and the hub node 20 is the third party local hub shown in FIG. 3. In addition to the IoT device and the third party local hub, the setting system shown in FIG. 3 further includes both the IoT APP and the cloud server IoT cloud corresponding to the IoT device and belonging to the same Internet of Things system as the IoT device. Each of the IoT APP and the IoT device belonging to the same Internet of Things system can perform data interaction with the IoT cloud.

The target controlled device 10 in the present application may be an Internet of Things device. As an example, in an application scenario of an intelligent home, a target controlled device may be an intelligent home appliance provided by a manufacturer A; and in an application scenario of intelligent security, the target controlled device may be an intelligent security device provided by the manufacturer A; and so on. The foregoing has specifically described an Internet of Things device, and the examples herein should not be construed as limiting the application.

In the present application, the hub node and the target controlled device belong to different Internet of Things systems, and the hub node is a node capable of controlling and managing the Internet of Things device. In the present application, the hub node may interact with the target controlled device, so as to enable the target controlled device to be controlled by the hub node. For example, referring to FIG. 3, the hub node is a third party local hub for the target controlled device, where the "third party" is used to emphasize that the hub node and the target controlled device belong to different Internet of Things systems, for example, the hub node and the target controlled device are Internet of Things devices belonging to different manufacturers; and "local hub" is used to emphasize that the hub node is a local device that can control and manage the target controlled device.

It should be noted that the Internet of Things system to which the hub node belongs may be provided with an Internet of Things App for the hub node, and the Internet of Things App and the target controlled device belong to different Internet of Things systems. Therefore, in some embodiments, the hub node may be specifically a terminal device running the Internet of Things App, which may control the target controlled device by performing steps in the method for setting the device control authority described in the present application. That is, the hub node may be in the form of a terminal device running the Internet of Things App in addition to the Internet of Things device. For example, the terminal device may include a mobile phone, a tablet computer, a notebook computer, and the like.

It should be noted that, similar to the target controlled device, the setting system provided in the present application may further include, in addition to the target controlled device and the hub node, other Internet of Things objects belonging to the same Internet of Things system as the hub node. For example, the setting system may include a cloud server corresponding to the hub node. For example, referring to FIG. 4, which shows another embodiment of a setting system provided herein. The IoT device in FIG. 4 is the target controlled device 10, where the IoT device, the IoT APP, and the IoT cloud belong to the same Internet of Things system. The third party local hub is a hub node 20, the third party cloud is a cloud server corresponding to the third party local hub, and the third party cloud and the third party local hub belong to the same Internet of things system. The third party local hub may perform data interaction with the third party cloud.

In the present application, the hub node may include at least one Internet of Things device. As an example, the hub node may specifically include an access management device, an access authentication device, a configuration device, a control device, and the like. The access management device may be configured to manage access of the Internet of Things device to the hub node. For example, the access management device may be an intelligent sound box or the like. The access authentication device may be configured to authenticate the hub node and the Internet of Things device. For example, the access authentication device may be an intelligent sound box or the like. The configuration device may be configured to configure the hub device and the Internet of Things device. For example, the configuration device may be a terminal running an Internet of Things client, an intelligent sound box, or the like. The control device may be configured to implement control of the Internet of Things device. For example, the control device may be an intelligent sound box or the like. For another example, the hub node may include only one Internet of Things device, e.g., an intelligent speaker, or an intelligent television, etc. For another example, a terminal device running the Internet of Things App may include a mobile phone, a tablet computer, a notebook computer, and the like. In the present application, the number or types of the Internet of Things devices included in the target controlled device and the number or types of the Internet of Things devices included in the hub node may be the same or different, which is not limited in the present application.

Based on the above-described setting system, a method for setting a device control authority provided in the present application will be described in detail next. Referring to the following embodiments.

As shown in FIG. 2, an embodiment of the present application provides a method for setting a device control authority. The method for setting the device control authority may include steps 101-104 as follows.

At step 101, a device capability request transmitted by a hub node that has established a connection relationship with a target controlled device may be received, where the target controlled device and the hub node belong to different Internet of Things systems.

The target controlled device receives a device capability request transmitted by the hub node for requesting to acquire data of a capability model of the target controlled device. Data formats of the device capability request may include a variety of data formats, for example, packet data, such as a multicast packet, a broadcast packet, or the like.

It should be noted that the connection relationship established between the target device and the hub node is a connection relationship in a configuration process. Specifically, a process in which the hub node performs device control for the target controlled device may include processes such as configuration, access management, access authentication, and control. The configuration process refers to steps having completed before steps required for subsequent implementation of access management, access authentication, and control. For example, the configuration process may include steps such as network distribution, identification, and connection.

In an alternative embodiment, the hub node may include the configuration device, and the hub node may obtain a capability model of the target controlled device via the configuration device. Specifically, the steps of "receiving a device capability request transmitted by a hub node that has established a connection relationship with a target controlled device, and responsive to the device capability request, returning device capability information of the target controlled device to the hub node" may include:

receiving a device capability request transmitted by the configuration device that has established a connection relationship with the target controlled device, and responsive to the device capability request, returning device capability information of the target controlled device to the configuration device.

As an example, in order to ensure the security of the data interaction, the target controlled device and the configuration device may make an agreement on a format of the device capability request, so that the configuration device may establish a connection relationship with the target controlled device. Further, the configuration device may request to obtain a capability model of the target controlled device by generating a device capability request meeting a preset agreement format and transmitting the device capability request to the target controlled device. Correspondingly, the target controlled device may return device capability information of the target controlled device to the configuration device in response to the device capability request.

In another alternative embodiment, the target controlled device may establish a connection relationship with the hub node, so that a device capability request transmitted by the hub node may be obtained based on the connection relationship. Specifically, the step of "receiving a device capability request transmitted by a hub node that has established a connection relationship with a target controlled device" may include:

establishing a connection relationship between the target controlled device and the hub node; and
receiving the device capability request transmitted by the hub node based on the connection relationship.

It should be noted that the connection relationship established here is a connection relationship in a configuration process. Specifically, a process in which the hub node performs device control for the target controlled device may include processes such as configuration, access management, access authentication, and control. The configuration process refers to steps having completed before steps required for subsequent implementation of access management, access authentication, and control. For example, the configuration process may include steps such as network distribution, identification, and connection.

There may be a number of ways of establishing the connection relationship between the target controlled device and the hub node. For example, the connection relationship can be implemented by exchanging a key, for example, by exchanging a Personal Identification Number (PIN) code. Specifically, the target controlled device and the hub node may establish an encrypted connection relationship by performing security negotiation via a known PIN code.

As an example, the key exchanging solution may be implemented by PreSharedKey (PSK) as defined in the Datagram Transport Layer Security (DTLS). For another example, the key exchanging solution may be implemented in conjunction with an Elliptic Curve Diffie-Hellman key Exchange (ECDH) algorithm and the PIN code, and so on.

After the connection relationship between the target controlled device and the hub node is established, the target controlled device can obtain the device capability request of the hub node based on the connection relationship. As an example, after the connection relationship between the target controlled device and the hub node is established, i.e., a connection channel for data interaction between the target controlled device and the hub node may be established, the target controlled device and the hub node may perform data interaction via the connection channel, for example, transmitting a device capability request and receiving a device capability request.

It should be noted in the present application that the hub node may include a configuration device, and the step of "establishing a connection relationship between the target controlled device and the hub node; and receiving the device capability request transmitted by the hub node based on the connection relationship" can be accomplished by the target controlled device in cooperation with the configuration device, that is, "establishing a connection relationship between the target controlled device and the configuration device; and receiving the device capability request transmitted by the configuration device based on the connection relationship".

In an alternative embodiment, taking into account that the target controlled device may correspond to a plurality of hub nodes to be established a connection relationship therewith to control the target controlled device, the target controlled device may determine a target hub node from the plurality of hub nodes and establish a connection with the target hub node. Specifically, the step of "establishing a connection relationship between the target controlled device and the hub node" can include:

receiving connection interrogation information transmitted by the hub node; and
in response to information format of the connection interrogation information meeting a preset interrogation format, establishing the connection relationship between the target controlled device and the hub node.
transmitting the interrogation response information to the hub node to establish the connection relationship between the target controlled device and the hub node based on the device information. Formats of the connection interrogation information may include a variety of formats, for example, a format of a packet, such as a multicast packet, a broadcast packet, or the like.

In a practical application, the target controlled device may receive the connection interrogation information transmitted by the hub node after being in a network distribution state. For example, the first Internet of Things system may be configured with an Internet of Things App (which may be referred to as the first Internet of Things App for differentiation) for the target controlled device, and a user may enable the target controlled device to enter the network distribution state via the first Internet of Things App. For another example, the user may directly interact with the target controlled device, for example, by triggering a physical control of the target controlled device, or by voice calling to interact with the target controlled device, so that the target controlled device enters the network distribution state. For another example, the target controlled device may always be in the network distribution state; and so on.

As an example, after entering the network distribution state, the target controlled device may enter a mode of a pre-agreed listening port, so that the target controlled device may listen for a broadcast packet in a local area network. Correspondingly, the hub node may transmit a multicast packet or a broadcast packet in the local area network by means of the multicast packet or the like, so as to transmit the connection interrogation information to the target controlled device. As such, the target controlled device can receive the connection interrogation information transmitted by the hub node.

In the present application, taking into account that the target controlled device can receive connection interrogation information transmitted by the plurality of hub nodes, a preset interrogation format can be set for the connection interrogation information in an application scenario in which device control is performed across Internet of things systems. As such, if the connection interrogation information of one of the hub nodes received by the target controlled device meets the preset interrogation format, a connection relationship between the target controlled device and the hub node is established.

It should be noted in the present application that the hub node may include a configuration device, and the steps of "receiving connection interrogation information transmitted by the hub node; and if information format of the connection interrogation information meets a preset interrogation format, establishing a connection relationship between the target controlled device and the hub node" can be accomplished by the target controlled device in cooperation with the configuration device, i.e. "receiving connection interrogation information transmitted by the configuration device; and if information format of the connection interrogation information meets a preset interrogation format, establishing a connection relationship between the target controlled device and the configuration device".

In some embodiments, after the target controlled device has received the connection interrogation request transmitted by the hub node and meeting the preset interrogation format, the target controlled device may generate interrogation response information for the connection interrogation information, so that the hub node may be informed of a response of the target controlled device to the connection interrogation information by transmitting the interrogation response information to the hub node. As such, both the target controlled device and the hub node may determine the connection relationship between the target controlled device and the hub node to be established. In this consensus, the target controlled device and the hub node may establish the connection relationship between the target controlled device and the hub node. Specifically, the step of "establishing a connection relationship between the target controlled device and the hub node" can include:

generating interrogation response information of the connection interrogation information, where the interrogation response information includes device information of the target controlled device; and transmitting the interrogation response information to the hub node to establish the connection relationship between the target controlled device and the hub node based on the device information.

The device information of the target controlled device may include information such as a device identification of the target controlled device and a system identification of the first Internet of Things system. The target controlled device may generate interrogation response information carrying its device information to enable the hub node to learn the response of the target controlled device to its connection interrogation request.

In the present application, similar to the connection interrogation information, an interrogation response format can be set for interrogation response information in an application scenario in which device control is performed across the Internet of things system. s Therefore, after receiving the connection interrogation information that is transmitted by the hub node and meets the preset interrogation format, the target controlled device may generate interrogation response information that meets the interrogation response format, and the interrogation response information may carry the device information of the target controlled device.

The target controlled device may transmit the interrogation response information to the hub node in a number of ways, for example, the target controlled device may reply to the hub node via unicast.

Similar to the case that the target controlled device may receive connection interrogation information from the plurality of hub nodes, each of the hub nodes may further transmit connection interrogation information to a plurality of Internet of Things devices, so that the hub node may receive interrogation response information from the plurality of Internet of Things devices. Since the interrogation response information includes the device information of the Internet of Things devices, the hub node may determine one of the Internet of Things devices with which the hub node decides to establish a connection relationship based on the interrogation response information.

As such, the target controlled device and the hub node can establish a preliminary connection consensus by means of the connection interrogation information and the interrogation response information and further establish a connection relationship between the target controlled device and the hub node.

It should be noted in the present application that the hub node includes a configuration device, and the steps of "generating interrogation response information of the connection interrogation information, where the interrogation response information includes device information of the target controlled device; and transmitting the interrogation response information to the hub node to establish a connection relationship between the target controlled device and the hub node based on the device information" can be accomplished by the target controlled device in cooperation with the configuration device, i.e. "generating interrogation response information of the connection interrogation information, where the interrogation response information includes device information of the target controlled device; and transmit the interrogation response information to the configuration device to establish a connection relationship between the target controlled device and the configuration device based on the device information".

Alternatively, in some embodiments, the target controlled device and the hub node may be authenticated by a connection relationship established between the target controlled device and the hub node, and when the authentication is passed, the target controlled device only receives data transmitted by the hub node, for example, a device capability request. Specifically, the step of "receiving a device capability request transmitted by the hub node based on the connection relationship" may include:

authenticating the hub node based on the connection relationship; and in response to the authentication being passed, receiving the device capability request transmitted by the hub node.

In the present application, the hub node is authenticated by the target controlled device, and the target controlled device may be used to determine an identity of the hub node, and, if the authentication is passed, to receive a device capability request transmitted by the hub node. For example, the device capability request transmitted by the hub node may be received based on the established connection relationship.

It should be noted that this step may be an optional step, that is, the target controlled device may not authenticate the hub node after establishing the connection relationship with the hub node. In this case, the target controlled device trusts all hub nodes approved by the user.

In the present application, the hub node may include a configuration device, and the steps of "authenticating the hub node based on the connection relationship; and if the authentication is passed, receiving the device capability request transmitted by the hub node" can be accomplished by the target controlled device in cooperation with the configuration device, that is, "authenticating the configuration device based on the connection relationship; and if the authentication is passed, receiving the device capability request transmitted by the configuration device".

The target controlled device may authenticate the hub node in a plurality of manners, for example, by performing identify authentication on the hub node with certificate authentication or key authentication, and so on. Specifically, the step of "authenticating the hub node based on the connection relationship" may include:

perform certificate authentication or key authentication on the hub node based on the connection relationship.

The certificate authentication refers to a technology for performing authentication based on a digital certificate, where the digital certificate refers to a digital authentication for marking identity information of various parties in the communication, and therefore the digital certificate is also referred to as a digital identification. The digital certificate is essentially an electronic document, and is a more authoritative and impartial certificate issued by a Certificate Authority (CA) center. The CA center adopts a digital certificate authentication technology based on a digital encryption technology. Through the digital certificate, the CA center can perform various processing such as encryption, decryption, digital signature and signature authentication on various information transmitted over the Internet while it can be ensured that the CA center is not intruded by lawbreakers in the process of digital transmission of the information, or the lawbreakers cannot view content in the CA center even if the CA center is intruded.

The key authentication means that a transmitter and a receiver of the information encrypt and decrypt the data with a key. The key can be divided into two types: a symmetric key and an asymmetric key. For example, encryption of the symmetric key is also known as encryption of a public key, and means that a transmitter and a receiver of the information encrypt and decrypt the data with a key. Its greatest advantage is that encryption/decryption is performed at a fast speed and suitable for encrypting large amounts of data, but management of the key is difficult. For another example, encryption of the asymmetric key is also known as encryption of a private key. It requires the use of a pair of keys to perform encryption and decryption operations, respectively, one of the keys is published, i.e., a public key, and the other one is kept secretly by the user himself, i.e. a private key. The information is encrypted by the transmitter with the public key and decrypted by the receiver with the private key.

It should be noted in the present application that the hub node may include a configuration device, and the steps of "authenticating the hub node based on the connection relationship" can be accomplished by the target controlled device in cooperation with the configuration device, that is, "authenticating the configuration device based on the connection relationship".

At step 102, device capability information of the target controlled device may be returned to the hub node responsive to the device capability request, where the device capability information is configured to instruct the hub node to generate device control information for the target controlled device.

In some embodiments, considering that the hub node needs to learn the device capability of the target controlled device before further generating the device control information, the device capability information of the target controlled device may be transmitted to the hub node by the target controlled device before the target controlled device obtains the device control information of the hub node, so that the hub node may further generate the device control information for the target controlled device. Specifically, the step of "responsive to the device capability request, returning device capability information of the target controlled device to the hub node" can include:

determining the device capability information of the target controlled device; and responsive to the device capability request, returning device capability information of the target controlled device to the hub node to trigger the hub node to generate device control information for the target controlled device based on the device capability information.

The device capability information of the target controlled device is related information describing the device capability that can be provided by the target controlled device. For example, the device capability information may include a specific model, a type, a controllable instruction, an attribute, a service, and the like of the device. It should be noted in a practical application that the device capability information of the target controlled device may also be referred to as a capability model of the target controlled device.

The target controlled device may determine its device capability information, and responsive to the device capability request of the hub node, return device capability information to the hub node to trigger the hub node to generate device control information for the target controlled device based on the device capability information received by the hub node.

The target controlled device may return the device capability information of the Internet of Things device to the hub node in a plurality of manners. For example, after the connection relationship between the target controlled device and the hub node is established, i.e., a connection channel for data interaction between the target controlled device and the hub node may be established, the target controlled device and the hub node may perform data interaction via the connection channel, for example, transmitting the device capability information and receiving the device capability information.

It should be noted in the present application that the hub node can include a configuration device, and the steps of "determining the device capability information of the target controlled device; and responsive to the device capability request, returning device capability information of the target controlled device to the hub node to trigger the hub node to generate device control information for the target controlled device based on the device capability information" can be accomplished by the target controlled device in cooperation with the configuration device, i.e., "determining the device capability information of the target controlled device; and responsive to the device capability request, returning device capability information of the target controlled device to the configuration device to trigger the hub node to generate device control information for the target controlled device based on the device capability information". The hub node may further include an access management device, and thus the target controlled device can trigger the access management device to generate device control information for the target controlled device based on the device capability information by returning the device capability information of the target controlled device to the configuration device in response to the device capability request.

At step 103, device control information transmitted by the hub node may be received.

The device control information transmitted by the hub node to the target controlled device is related information indicating that the target controlled device sets a control authority, and the control authority is a device control authority of the hub node for the target controlled device.

It should be noted in the present application that the hub node may include an access management device, and the step of "receiving device control information transmitted by the hub node" can be accomplished by the target controlled device in cooperation with the access management device, that is, "receiving device control information transmitted by the access management device".

In some embodiments, the hub node may include a configuration device and an access management device, and the configuration device may be configured to establish a connection relationship with the target controlled device via the foregoing steps, and the target controlled device may be configured to establish a connection relationship with the access management device via the configuration device, so that the device control information transmitted by the access management device may be further obtained based on the connection relationship. Specifically, the step of "receiving the device control information transmitted by the hub node" may include:

establishing an access connection relationship with the access management device via the configuration device; and receiving device control information transmitted by the access management device based on the access connection relationship.

It should be noted that the access connection relationship established here is a connection relationship in an access management process, and as an example, the access connection relationship may be a connection relationship established between the target controlled device and the access management device. Specifically, a process in which the hub node performs device control for the target controlled device may include processes such as configuration, access management, access authentication, and control. The access management refers to a process of managing access of an Internet of Things device to a hub node. For example, the access management may include steps such as device discovery, device connection, device authentication, and device registration.

In the present application, since the configuration device in the hub node has established the connection relationship with the target controlled device, optionally, a step of device authentication may be performed between the configuration device and the target controlled device, for example, through the certificate authentication or the key authentication and the like. Therefore, the configuration device can be configured as a device trusted by the target controlled device. Thus, the access connection relationship between the target controlled device and the access management device in the hub node can be established by the configuration device in the hub node.

The step of "establishing an access connection relationship with the access management device via the configuration device" may be described below.

There may be a plurality of manners of establishing an access connection relationship with the access management device via the configuration device. For example, the access management device trusted by the configuration device may be directly configured as the access management device trusted by the target controlled device, and then the access connection relationship between the target controlled device and the access management device may be established.

For another example, in some embodiments, data transmission may be performed by the configuration device, so that the target controlled device may obtain related information of the access management device via the configuration device, thereby determining whether the access connection relationship with the access management device is established. Specifically, the step of "establishing an access connection relationship with the access management device via the configuration device" may include:

obtain communication address information of the access management device via the configuration device; and establish an access connection relationship with the access management device based on the communication address information.

The communication address information is used for communication between a device and the access management device. For example, the communication address information may include physical address information, logical address information, port address information, specific address information, and the like.

In an alternative embodiment, the communication address information of the access management device may be obtained via the configuration device, and the communication address may specifically include the logical address information and the port address information of the access management device. For example, an IP address and a port number of the access management device may be obtained via the configuration device.

In the present application, the target controlled device may obtain the communication address information of the access management device via the configuration device in a plurality of manners. For example, the configuration device may directly transmit the communication address information of the access management device to the target controlled device, so that the target controlled device obtains the communication address information of the access management device transmitted by the configuration device. Specifically, the step of "obtaining communication address information of the access management device via the configuration device" can include:

obtaining communication address information of the access management device transmitted by the configuration device.

As an example, referring to FIG. 5, an IoT device denoted as 1001 is the target controlled device, the third party configurator denoted as 1002 is the configuration device of the hub node, and the access management module denoted as 1003 is the access management device of the hub node. The third party configurator and the access management module belong to the same Internet of Things system, and the third party configurator and the IoT device belong to different Internet of Things systems, and the third party configurator establishes a connection relationship with the IoT device.

Specifically, referring to FIG. 5, the access management module may transmit its communication address information (e.g., an IP address and a port number) to the third party configurator. Further, the third party configurator may transmit its received communication address information of the access management module to the IoT device. For example, the communication address information of the access management module may be transmitted to the IoT device via a connection relationship between the third party configurator and the IoT device, so that the IoT device may correspondingly obtain the communication address information of the access management module.

It should be noted in the example that, if a device corresponding to the third party configurator is the same device as that corresponding to the access management module, the third party configurator may directly obtain the communication address information of the access management module from the access management module. However, if the device corresponding to the third party configurator and the device corresponding to the access management module are not the same device, the third party configurator may obtain the communication address information of the access management module across the devices in a plurality of manners, for example, by exchanging via a local area network or a third party cloud 1004 shown in FIG. 5, where the third party cloud is a cloud server corresponding to the hub node, and the third party cloud and the hub node belong to the same Internet of things system.

In the present application, the target controlled device may obtain the communication address information of the access management device via the configuration device in a plurality of manners. For example, the configuration device may directly transmit related information required for verifying the access management device to the target controlled device, so that the target controlled device may further, after obtaining the information, determine a target access management device from candidate access management devices by performing steps such as device finding and device verification, and thus further obtain the communication address information transmitted by the target access management device. Specifically, the step of "obtaining communication address information of the access management device via the configuration device" can include:

obtaining device verification information of the access management device transmitted by the configuration device, where the device verification information transmitted by the configuration device is configured to verify the access management device; and obtaining the communication address information transmitted by the access management device based on the device verification information transmitted by the configuration device.

The device verification information transmitted by the configuration device is related information required for verifying the access management device. Specifically, since the configuration device has established a connection relationship with the target controlled device, the configuration device may be a device trusted by the target controlled device.

The device verification information transmitted by the configuration device may be in a variety of forms, for example, may be a character string, a value, or a collection and the like.

Since the configuration device and the access management device belong to the same Internet of things system (for distinguishing purposes in the present embodiment, the access management device of the same IoT system to which the configuration device belongs may be referred to as a target access management device), the configuration device and the target access management device may be the same Internet of things device in the same Internet of things system or different Internet of things devices in the same Internet of things system. If the configuration device and the target access management device are the same Internet of things device in the same Internet of things system, the configuration device may be considered as a device trusted by the target access management device. If the configuration device and the target access management device are the different Internet of things devices in the same Internet of things system, the configuration device and the target access management device may establish a trust relationship between the configuration device and the target access management device through internal data interaction in the same Internet of things system, such as internal authorization. As such, the configuration device may be considered as a device trusted by the target access management device.

Therefore, the configuration device can be configured as a device that is trusted by both the target access management device and the target controlled device, and the configuration device may transmit the device verification information of the target access management device to the target controlled device, so that the target controlled device may subsequently verify a plurality of candidate access management devices based on the device verification information to determine the target access management device therefrom, thereby obtaining the communication address information of the access management device.

As an example, the system identification of the target Internet of things system may be determined as the device verification information, where the target Internet of things system is an Internet of things system to which the target access management device belongs. In a practical application, the system identification of the target Internet of things system may also be referred to as an ecological identification code of the target Internet of things system, which may be used to uniquely identify a third party manufacturer. For another example, a format of the device verification information may be predetermined, and the target access management device may generate data meeting the format, and use the data as the device verification information.

In the present embodiment, the target access management device may transmit its device verification information to the configuration device to transmit the device verification information to the target controlled device via the configuration device, so that the target controlled device can obtain the device verification information of the target access management device transmitted by the configuration device, where the device verification information transmitted by the configuration device can be used for the target controlled device to verify at least one candidate access management device.

Further, the target controlled device may obtain the communication address transmitted by the target access management device based on the device verification information transmitted by the configuration device. For example, the target controlled device may verify at least one candidate access management device based on the device verification information transmitted by the configuration device to determine the target access management device from the candidate access management devices based on a verification result, and thus obtain the communication address information transmitted by the target access management device. Specifically, the step of "obtaining the communication address information transmitted by the access management device based on the device verification information transmitted by the configuration device" can include:

obtaining device verification information and communication address information transmitted by each of candidate access management devices;

verifying the device verification information of the candidate access management device based on the device verification information transmitted by the configuration device; and in response to the verification being passed, determining that the communication address information transmitted by the candidate access management device is communication address information transmitted by the access management device.

For the target controlled device, the configuration process and the access management process may be continuous or spaced in a practical application. Therefore, after the configuration device and the target controlled Internet of Things have completed device configuration, there may be at least one access management device requesting to establish an access connection relationship with the target controlled device in the access management process. These access management devices may be the same Internet of Things system to which the configuration device belongs, or may be different Internet of Things system that an Internet of Things to which the configuration device belongs. In the present application, these access management devices may be referred to as candidate access management devices of the target controlled device.

The target controlled device may obtain the device verification information and the communication address information transmitted by each of the candidate access management devices in a plurality of manners. For example, the candidate access management device may actively transmit the connection verification information and the communication address information of the candidate access management device to the target controlled device.

For another example, the target controlled device may initiate a device finding to search for candidate access management devices. Further, each of the candidate access management devices may transmit connection verification information and communication address information of the candidate access management device to the target controlled device in response to a device finding request of the target controlled device. Specifically, the step of "obtaining connection verification information and communication address information transmitted by each of the candidate access management devices" may include:

generating device finding information to transmit the device finding information to the candidate access management device; and obtaining response information generated by the candidate access management device based on the device finding information, where the response information includes the device verification information and the communication address information of the candidate access management device.

The device finding information is related information for searching for the access management device. For example, the device finding information may be a device finding request, and the target controlled device may search for candidate access management devices by transmitting the device finding request.

The target controlled device may transmit the device finding information to the candidate access management devices in a plurality of ways. For example, the target controlled device may generate a device finding packet, where the device finding packet may include the device finding information. Further, the target controlled device may transmit a device finding packet to the candidate access management devices in the local area network through a local area network broadcast, multicast, or the like, so as to transmit the device finding information to the candidate access management devices.

In response, each of the candidate access management devices may generate response information, where the response information may include device verification information and communication address information of the candidate access management device. Each of the candidate access management devices may transmit the generated response information to the target controlled device so that the target controlled device may correspondingly obtain the response information generated by the candidate access management device based on the device finding information, where the response information includes the device verification information and the communication address information of the candidate access management device.

After obtaining the device verification information and the communication address information transmitted by each of the candidate access management devices, the target controlled device may further verify the device verification information transmitted by the candidate access management device based on the device verification information transmitted by the configuration device.

There may be a plurality of verification modes, for example, comparison of the device verification information, calculation of the device verification information, interrogation and matching of the device verification information, and the like.

For example, verifying the device verification information transmitted by the candidate access management device may be implemented by comparing the device verification information. Specifically, the target controlled device may compare the device verification information transmitted by each of the candidate access management devices with the device verification information transmitted by the configuration device, so as to verify the device verification information of the candidate access management device based on the device verification information transmitted by the configuration device. Specifically, if the comparison result is consistent, it may be determined that the verification is passed. Otherwise, it is determined that the verification fails.

For another example, verifying the device verification information transmitted by each of the candidate access management device may be implemented by calculating the device verification information. Therefore, the device verification information transmitted by the configuration device may be preset value information, such as a preset value or a value range. As an example, the device verification information transmitted by the configuration device may be a preset value range. After obtaining the device verification information transmitted by each of the candidate access management devices, the target controlled device may calculate the device verification information, and compare a calculation result with the preset value range, so as to verify the device verification information. Specifically, if the calculation result falls within the preset value range, the target controlled device may determine that the verification is passed. Otherwise, it is determined that the verification fails.

For another example, verifying the device verification information transmitted by each of the candidate access management devices may be implemented by interrogating and matching the device verification information. Therefore, the device verification information transmitted by the configuration device may be a preset information set, and at least one information element may be included in the set. For example, the set may include at least one piece of device verification information authenticated by the target device. After obtaining the device verification information transmitted by each of the candidate access management devices, the target controlled device may verify the device verification information by interrogating whether there is an information element matching the device verification information in the information set. Specifically, if there is an information element matching the device verification information in the information set, the target controlled device may determine that the verification is passed. Otherwise, it is determined that the verification fails.

The target controlled device may verify the device verification information of each of the candidate access management devices to obtain a verification result. If verifying of the device verification information of each of the candidate access management devices is passed, the target controlled device may determine the communication address information transmitted by the candidate management device as the communication address information of the target access management device. In this case, the target controlled device obtains the communication address information of the target access management device through steps such as device discovery and information verification.

In the present application, the configuration device obtains the communication address information of the access management device, and the target controlled device can further establish an access connection relationship with the access management device based on the communication address information. For example, the communication address information of the access management device may include an IP address and a port number, and the target controlled device may establish an access connection relationship with the access management device in the local area network according to the IP address and the port number of the access management device, and further establish a connection channel for data interaction between the target controlled device and the access management device.

The step of "receiving device control information transmitted by the access management device based on the access connection relationship" can be further explained below after explaining the step of "establishing an access connection relationship with the access management device via the configuration device".

After the access connection relationship between the target controlled device and the access management device is established, the target controlled device can receive device control information transmitted by the access management device based on the access connection relationship. As an example, after the access connection relationship between the target controlled device and the access management device is established, i.e., a connection channel for data interaction between the target controlled device and the access management device may be established, the target controlled device and the access management device may perform data interaction via the connection channel, for example, transmitting device control information and receiving the device control information.

It should be noted alternatively that, after the access connection relationship between the target controlled device and the access management device is established, the target controlled device can further perform identify authentication on the access management device and, after the authentication is passed, further receive the device control information transmitted by the access management device based on the access connection relationship. Specifically, the step of "receiving device control information transmitted by the access management device based on the access connection relationship" can include:

authenticating the access management device based on the access connection relationship; and
  in response to the authentication being passed, receiving device control information transmitted by the access management device.

The access management device is authenticated on a basis of establishing the access connection relationship between the target controlled device and the access management device for the target controlled device to further perform identity verification on the access management device, thereby improving security of data interaction.

As an example, after the connection relationship between the target controlled device and the access management device is established, i.e., a connection channel for data interaction between the target controlled device and the access management device may be established, the target controlled device and the access management device may perform data interaction via the connection channel, for example, transmitting and receiving related data required for authentication.

In the present application, the target controlled device may authenticate the access management device in a plurality of manners, for example, similar to establishing an access connection relationship between the target controlled device and the access management device. Considering that the configuration device is configured as a device trusted by the target controlled device while serving as a device trusted by the access management device, the target controlled device may obtain related data required for authenticating the access management device via the configuration device, and authenticate the access management device based on the data. Specifically, the step of "authenticating the access management device" can include:

obtaining authentication verification information of the access management device transmitted by the configuration device; and
  authenticating the access management device with the authentication verification information transmitted by the configuration device.

The authentication verification information transmitted by the configuration device is related information required for authenticating the access management device. The authentication verification information transmitted by the configuration device may be in a variety of forms, for example, may be a character string, a value, or a collection and the like.

As an example, the system identification of the target Internet of things system may be determined as the authentication verification information, where the target Internet of things system is an Internet of things system to which the configuration device belongs. In a practical application, the system identification of the target Internet of things system may also be referred to as an ecological identification code of the target Internet of things system, which may be used to uniquely identify a third party manufacturer. For another example, a format of the authentication verification information may be predetermined, and the access management device may generate data meeting the format, and use the data as the authentication verification information.

There may be a plurality of manners that the target controlled device obtains the authentication verification information transmitted by the configuration device. For example, the target controlled device may obtain the authentication verification information transmitted by the configuration device based on the connection relationship established with the configuration device.

It should be noted in the present application that, if the authentication verification information is the same as the device verification information, for example, if the authentication verification information and the device verification information may both be ecological identification codes of the target Internet of things system, the target controlled device may save the device verification information after obtaining the device verification information of the access management device via the configuration device, so that, when the target controlled device needs to authenticate the access management device, the target controlled device may directly obtain the authentication verification information required for performing the authentication.

After obtaining the authentication verification information of the access management device transmitted by the configuration device, the target controlled device can determine the authentication verification information required for authenticating the access management device. Further, the target controlled device can authenticate the access management device with the authentication verification information.

There are a plurality of manners that the target controlled device may authenticate the access management device with the authentication verification information transmitted by the configuration device. For example, the target controlled device may further obtain the device authentication information transmitted by the access management device, and verify the device authentication information transmitted by the configuration device with the authentication verification information transmitted by the configuration device to authenticate the access management device. Specifically, the step of "authenticating the access management device with the authentication verification information transmitted by the configuration device" can include:

obtaining device authentication information transmitted by the access management device; and verifying the device authentication information with the authentication verification information to authenticate the access management device.

The device authentication information transmitted by the access management device is related data required for the target controlled device to authenticate the access management device. Specifically, the target controlled device may verify the device authentication information with the authentication verification information to determine the device authentication result of the access management device based on the verification result. As such, the target controlled device may verify the device authentication information transmitted by the access management device to authenticate the access management device.

There may be a plurality of manners that the target controlled device may obtain the device authentication information transmitted by the access management device. For example, after the access connection relationship between the target controlled device and the access management device is established, i.e., a connection channel for data interaction between the target controlled device and the access management device may be established, the target controlled device and the access management device may perform data interaction via the connection channel, for example, transmitting device authentication information and receiving the device authentication information.

As an example, the device authentication information required for authenticating the access management device may be generated by the access management device and further transmitted to the target controlled device based on the access connection relationship between the access management device and the target controlled device.

As another example, the hub node may include an access authentication device in addition to the configuration device and the access management device, where the access authentication device may be configured to perform related matters of device authentication. For example, the hub node may generate device authentication information of the access management device via the access authentication device, so that the target controlled device may authenticate the access management device by verifying the device authentication information. As such, the hub node can efficiently effect the entire hub node by assigning matters related to device authentication to the access authentication device for execution, and can effectively reduce the burden on each of the Internet of Things devices in an application scenario in which the hub node includes at least one available Internet of Things device. Specifically, the step of "obtaining device authentication information transmitted by the access management device" can include:

generating an authentication request to transmit the authentication request to the access management device; and obtaining device authentication information returned by the access management device responsive to the authentication request, where the device authentication information is generated by the access authentication device, and the access authentication device and the access management device belong to the same Internet of things system.

The authentication request generated by the target controlled device can be configured to request to obtain the device authentication information of the access management device, so that the target controlled device can authenticate the access management device by verifying the device authentication information. Forms of the authentication request may include a variety of forms, for example, a form of a packet, such as a broadcast packet, a multicast packet, or the like.

The target controlled device may generate the authentication request and transmit the authentication request to the access management device based on the access connection relationship established with the access management device. For the authentication request transmitted by the target controlled device, the access management device may delegate the access authentication device to perform the authentication. Correspondingly, the access authentication device may generate device authentication information required for authenticating the access management device, so that the access management device may return the device authentication information generated by the access authentication device to the target controlled device in response to the authentication request transmitted by the target controlled device. Accordingly, the target controlled device may obtain the device authentication information required for authenticating the access management device.

As an example, referring to FIG. 5, an IoT device denoted as 1001 is the target controlled device, the access management module denoted as 1003 is the access management device of the hub node, and the access authentication module denoted as 1005 is the access authentication device of the hub node. The access authentication device and the access management module belong to the same Internet of Things system, and the access management module and the IoT device belong to different Internet of Things systems, and the access management module has established an access connection relationship with the IoT device.

Specifically, referring to FIG. 5, the IoT device can generate an authentication request to transmit the authentication request to the access management module. For the authentication request transmitted by the IoT device, the access management module may delegate the access authentication module to perform the authentication, and the access authentication module may further generate device authentication information required for the IoT device to authenticate the access management module, and return the device authentication information to the access management module, so that the access management module may return the device authentication information to the IoT device in response to the authentication request transmitted by the IoT device. As such, the IoT device can obtain the device authentication information returned by the access management module in response to the authentication request, where the device authentication information is generated by the access authentication module, and the access authentication module and the access management module belong to the same Internet of things system.

After obtaining the device authentication information transmitted by the access management device, the target controlled device may further verify the device authentication information transmitted by the access management device with the authentication verification information transmitted by the configuration device, so as to authenticate the access management device.

In the present application, there may be a plurality of manners that the target controlled device may verify the device authentication information with the authentication verification information, for example, referring to the manner that the target controlled device may verify the device verification information transmitted by each of the candidate access management devices with the device verification information transmitted by the configuration device. Specifically, the manners may include information comparison, information calculation, interrogation matching, and the like, which are not repeatedly described herein.

For another example, a manner in which the target controlled device authenticates the access management device may be performed by the certificate authentication, and the device authentication information transmitted by the access management device to the target controlled device may be specifically a certificate. As an example, an example in which the authentication verification information is used as an ecological identification code of the target Internet of things system, and the target Internet of things system is an Internet of Things system to which the access management device belongs, and the device authentication information is used as a certificate may be taken to explain "verifying the device authentication information with the authentication verification information to authenticate the access management device". Specifically, if the certificate transmitted by the access management device to the target controlled device is a certificate issued by a trusted CA and matched with the ecological identification code, the target controlled device may determine that a verification result of the certificate is that the verification is passed, that is, the authentication result of the access management device is that the authentication is passed. Otherwise, the target controlled device may determine that the verification result of the certificate is that the verification fails, that is, the authentication result of the access management device is that the authentication fails.

In the present application, if the target controlled device authenticates the access management device, the target controlled device may further receive the device control information transmitted by the access management device based on the authentication result. Specifically, if the target controlled device has successfully authenticated the access management device, the target controlled device may receive the device control information transmitted by the access management device.

In an alternative embodiment, considering that, after the target controlled device has authenticated the access management device, in response to the authentication being passed, the target controlled device may further perform device registration with the access management device, and thus, specifically, the step of "in response to the authentication being passed, receiving device control information transmitted by the access management device" can include:

in response to the authentication being passed, transmitting device information of the target controlled device to the access management device to perform device registration with the access management device; and receiving the device control information transmitted by the access management device based on a registration result.

The device information of the target controlled device may include related information such as a device type of the target controlled device, and a binding code, where the binding code is used for the hub node to bind the target controlled device to a user, and the user refers to a user associated with the hub node, for example, a user logged in on the configuration device.

Further, the target controlled device can receive the device control information transmitted by the access management device based on a registration result. In a practical application, there may be multiple manners of receiving the device control information transmitted by the access management device based on the registration result. For example, if the registration is successful, the target controlled device may receive the device control information transmitted by the access management device. Otherwise, the target controlled device may not receive the device control information transmitted by the access management device.

For another example, after the target controlled device performs device registration with the access management device, device control information transmitted by the access management device can be received. That is, the device control information transmitted by the access management device can be received as long as the target controlled device requests to perform device registration with the access management device, regardless of whether the registration result is successful or not.

As an example, referring to FIG. 5, after the IoT device completes authentication of the access management module, the IoT device transmits its own device information to the access management module for device registration. The device information may specifically include information such as a device type and a binding code. Further, the IoT device may receive the device control information transmitted by the access management module after successful registration.

At step 104, authority information of the hub node for the target controlled device may be set based on the device control information.

It should be noted in the present application that the hub node may include a control device, and the step of "setting authority information of the hub node for the target controlled device based on the device control information" can be accomplished by the target controlled device in cooperation with the control device, i.e., "setting authority information of the control device for the target controlled device based on the device control information".

Additionally, in the present application, the hub node may include an access management device, and the step of "setting authority information of the hub node for the target controlled device based on the device control information" can be accomplished by the target controlled device in cooperation with the access management device, that is, "setting authority information of the access management device for the target controlled device based on the device control information". The information changing authority represents a changing authority of the access management device for the device control information stored in the target controlled device.

An example in which the step of "setting authority information of the hub node for the target controlled device based on the device control information" is accomplished by the target controlled device in cooperation with the hub node is taken below for explanation, and the case that the step is accomplished by the target controlled device in cooperation with the control device is not repeatedly described herein.

Since the device control information of the hub node is related information indicating that the target controlled device sets the control authority and the control authority is the device control authority of the hub node for the target controlled device, the target controlled device can set the device control authority of the hub node for the target controlled device based on the obtained device control information.

There may be a plurality of manners of setting the device control authority of the hub node for the target controlled device based on the device control information. For example, related data of maintaining the device control authority in the target controlled device may be modified based on the device control information, so that the target controlled device may set the device control authority of the hub node for the target controlled device according to the modified related data. As an example, the setting of the device control authority of the hub node for the target controlled device may be implemented by setting Access Control Lists (ACL) of the target controlled device based on the device control information.

The ACL is an access control technology based on packet filtering, which can filter packets on an interface according to a set condition, and allow the packets to pass or be discarded. The access control lists are widely applied to routers and layer-3 switches, and access of a user to a network can be effectively controlled by means of the access control lists, thereby ensuring network security to the maximum extent.

In an alternative embodiment, considering that the hub node and the target controlled device belong to different Internet of Things systems, device control of the hub node to the target controlled device is essentially a device control performed across the Internet of Things systems. The device control object may implement device control of the target controlled device via the hub node. Therefore, the setting of the device control authority of the hub node for the target controlled device can be implemented by setting a device control authority of a device control object in a second Internet of Things system for the target controlled device.

Specifically, the device control information includes a system identification of a target Internet of Things system and an object identification of a device control object, where the target Internet of Things system is an Internet of Things system to which the hub node belongs, and the device control object is an object that controls an Internet of Things device via the hub node. Thus, the step of "setting authority information of the hub node for the target controlled device based on the device control information" can include:

setting a device control authority of the device control object in the target Internet of Things system for the target controlled device based on the system identification and the object identification.

The system identification is identification information for uniquely identifying the Internet of things system, and the system identification may be in a variety of forms, for example, may include different data forms such as a character string, an image, and an audio. In a practical application, the system identification of the target Internet of things system may be referred to as an ecological identification code of the target Internet of things system, which may be used to uniquely identify a third party manufacturer. For example, the hub node may include an access management device, and correspondingly, the system identification of the Internet of things to which the hub node belongs may be an ecological identification code of the access management device.

The object identification is identification information for uniquely identifying a device control object in the Internet of things system, and the object identification may be in a variety of forms, for example, may include different data forms such as a character string, an image, and an audio. The device control object is an object for controlling the Internet of Things device. For example, the device control object may be an Internet of Things device or the like. In a practical application, the object identification of the device control object may be referred to as a subject Identity Document (ID), where the subject ID may be used to uniquely identify a user or an Internet of Things device within a third party manufacturer (the Internet of Things device may act as a controller in an application scenario of device control) and may be unique within the third party manufacturer.

In a practical application, the hub node may allocate different object identification to different device control objects in the target Internet of Things system. For example, the access management device may allocate different subject IDs to different controllers, users, etc., within its own ecology.

After determining the system identification of the target Internet of Things system and the object identification of the device control object, the target controlled device may further set the device control authority of the device control object in the target Internet of Things system for the target controlled device based on the system identification and the object identification.

As an example, if the system identification is an identification a corresponding to a manufacturer A and the object identification is an identification b corresponding to a user B in the device control information received by the target controlled device, the target controlled device may modify the ACL of the target controlled device based on the identification a and the identification b. As such, the user B may set the device control authority of the target controlled device. It should be noted that the device control authority provided here is a control authority on the target controlled device owned by the user B in the Internet of things system corresponding to the manufacturer A.

As another example, if the system identification is an identification a corresponding to a manufacturer C and the object identification is an identification b corresponding to a user B in the device control information received by the target controlled device, the target controlled device may set a device control authority of the user B for the target controlled device similarly. It should be noted that the device control authority provided here is a control authority for the target controlled device owned by the user B in the Internet of things system corresponding to the manufacturer C.

As another example, if the system identification is an identification a corresponding to a manufacturer A and the object identification is an identification b corresponding to a controller D in the device control information received by the target controlled device, the target controlled device may set a device control authority of the controller D for the target controlled device similarly. It should be noted that the control authority provided here is a control authority for the target controlled device owned by the controller D in the Internet of things system corresponding to the manufacturer A.

In an alternative embodiment, considering that, in an application scenario in which device control is performed across the Internet of things systems, a different authority may be allocated to each of device control objects in the target Internet of things system, and the authority may be embodied by an object attribute of the device control object. Therefore, the device control information obtained by the target controlled device may further include object attribute information of the device control object. Specifically, the step of "setting a device control authority of the device control object in the target Internet of Things system for the target controlled device based on the system identification and the object identification" can include:

determining a service calling authority of the device control object for the target controlled device based on the object attribute information, where the service calling authority is a calling authority of the device control object for a service provided by the target controlled device, and the service provided by the target controlled device is determined based on the device capability information of the target controlled device; and setting a device control authority of the device control object in the target Internet of Things system for the target controlled device based on the service calling authority.

The object attribute information is used to describe object attributes of the device control object, different object attributes represent different roles, and different roles represent different authority. For example, the authorities may include a service calling authority and an information changing authority. In the present application, each of the object identification of the device control object corresponds to one of the object attributes of the device control object, respectively. That is, in a practical application, each of the roles of the device control object corresponds to one of the subject IDs, respectively.

For example, if the object attribute of the device control object is role 1, it indicates that the device control object has only the service calling authority for the target controlled device, and if the object attribute of the device control object is role 2, it indicates that the device control object has the service calling authority and the information changing authority for the target controlled device. For another example, if the object attribute of the device control object is role 1, it indicates that the device control object has only the service calling authority for the target controlled device; if the object attribute of the device control object is role 2, it indicates that the device control object has the information changing authority for the target controlled device; and if the object attribute of the device control object is role 3, it indicates that the device control object has the service calling authority and the information changing authority for the target controlled device; and so on.

In some embodiments, the object attribute of the device control object may include an administrator and an ordinary user. Specifically, if the object attribute of the device control object is the administrator, the device control object may have an information changing authority and a service calling authority for the target controlled device; and if the object attribute of the device control object is the ordinary user, the device control object may have only the service calling authority on the target controlled device.

The information changing authority represents a changing authority of the device control object for the device control information stored by the target controlled device. For example, the information changing authority represents a changing authority of the device control object for the ACL of the target controlled device.

The service calling authority is a calling authority of the device control object for a service provided by the target controlled device, and the service provided by the target controlled device is determined based on the device capability information of the target controlled device. If the device control object has a service calling authority for the target controlled device, the device control object can call a service authorized in the target controlled device. For example, the target controlled device may be an intelligent air conditioner, the service provided by the target controlled device may include a refrigeration service, a dehumidification service, a heating service, and the like. If the device control object has a service calling authority for the intelligent refrigerator, the device control object can call a service authorized in the intelligent refrigerator.

Therefore, the target controlled device may determine whether the device control object has a service calling authority for the target controlled device based on the object attribute information of the device control object, so that the target controlled device may further set a device control authority of the device control object in the target Internet of Things system for the target controlled device.

As an example, if the target controlled device may be an intelligent television, the device control object of the hub node may be a child E, and the object attribute of the child E is an ordinary user, then, the intelligent television may determine that the child E has the service calling authority for the intelligent television based on the object attribute information of the child E, and set the device control authority of the child E in the target Internet of Things system for the intelligent television, including the service calling authority for the intelligent television.

In another embodiment, the device control information may further include service accessing information of the device control object, where the service accessing information includes an authorized access service of the device control object to the target controlled device, and an access authority of the device control object for the authorized access service. Therefore, the target controlled device may determine the service accessing authority of the device control object for the target controlled device based on the service accessing information after determining that the device control object has the service calling authority for the target controlled device, so as to further determine the service calling authority of the device control object for the target controlled device. Specifically, the step of "determining a service calling authority of the device control object for the target controlled device" can include:

determining a service accessing authority of the device control object for the target controlled device based on the service accessing information.

As an example, the target controlled device may be an intelligent television, the device control object of the hub node may be a child E, the object attribute of the child E is an ordinary user, the service accessing information of the child E includes an authorized access service of the child E to the intelligent television and an access authority of the child E for the authorized access service. Specifically, the authorized access service of the child E to the intelligent television includes following two services: viewing a science and education channel, and viewing an animation channel, and the access authority of the child E for the "viewing a science and education channel" is two hours per day, and the access authority of the child E for the "viewing an animation channel" is one hour per day. Then, the intelligent television may determine the service accessing authority of the child E for the intelligent television based on the authorized access service of the child E and the access authority of the child E for the authorized access service, so as to further determine what service in the intelligent television the child E can specifically access and the specific authority of the child E for the accessible service on the basis of determining that the child E has the service calling authority for the intelligent television.

In another alternative embodiment, if the object attribute information of the device control object indicates that the device control object further has the information changing authority for the target controlled device, the target controlled device may correspondingly set the device control authority of the device control object for the target controlled device. Specifically, the step of "setting the device control authority of the device control object in the target Internet of Things system for the target controlled device based on the service call authority" can include:

if the object attribute information indicates that the device control object has an information changing authority for the target controlled device, setting a device control authority of the device control object in the target Internet of Things system for the target controlled device based on the information changing authority and the service calling authority, where the information changing authority represents a changing authority of the device control object for the device control information stored in the target controlled device.

As an example, if the target controlled device may be an intelligent television, the device control object of the hub node may be an adult F, and the object attribute of the adult F is an administrator, then, the intelligent television may determine that the adult F has the service calling authority and information changing authority for the intelligent television based on the object attribute information of the adult F, and set the device control authority of the adult F in the target Internet of Things system for the intelligent television, including the service calling authority and information changing authority for the intelligent television.

In a practical application, the device control information received by the target controlled device may further include information such as a device ID, a connection key, and a key expiration time of the connection key, in addition to a system identification of an Internet of Things system to which the hub node belongs, object identification of the device control object, object attribute information, and service accessing information.

The device ID is further referred to as a target device identification, which is a unique ID assigned by the target Internet of Things system for the target controlled device and can be used to uniquely identify a device in the target Internet of Things system. The connection key may be used for the target controlled device to establish a control connection with the hub node, and each of the connection keys corresponds to one of the object identifications, respectively.

In a practical application, the hub node may allocate different object identifications, keys, object attributes, and the like to different device control objects in the target Internet of Things system. For example, the access management device may allocate different subject IDs, keys, roles, and the like to different controllers within its own ecology.

The process of setting the device control authority is described above from the perspective of the Internet of Things device. In a practical application, the device control may be further performed on the basis of the foregoing process. Specifically, the method for setting the device control authority may further include:

receiving a device control instruction transmitted by the hub node, where the device control instruction is configured for the hub node to perform device control for the target controlled device; and executing an operation corresponding to the device control instruction.

It should be noted in the present application that the hub node may include a control device, and the step of "receiving a device control instruction transmitted by the hub node, where the device control instruction is configured for the hub node to perform device control for the target controlled device" can be accomplished by the target controlled device in cooperation with the control device, i.e., "receiving a device control instruction transmitted by the control device, where the device control instruction is used for the control device to perform device control for the target controlled device; and performing an operation corresponding to the device control instruction".

In the present application, there may be multiple manners in which the target controlled device receives the device control instruction transmitted by the hub node. For example, in some embodiments, referring to FIG. 6, the hub node may transmit the device control instruction to a second cloud server paired with the hub node, and further the second cloud server may transmit the device control instruction to the target controlled device so that the target controlled device may receive the device control instruction transmitted by the hub node. Specifically, the step of "receiving the device control instruction transmitted by the hub node" may include:

receiving a device control instruction transmitted by a second cloud server paired with the hub node, wherein the device control instruction is an instruction transmitted by the hub node to the second cloud server.

It should be noted that the second cloud server paired with the hub node may be a cloud server of the same Internet of Things system as the hub node. In addition, in the present application, the hub node may include a control device, and the step of "receiving a device control instruction transmitted by a second cloud server paired with the hub node, where the device control instruction is an instruction transmitted by the hub node to the second cloud server" can be accomplished by the target controlled device in cooperation with the control device, i.e., "receiving a device control instruction transmitted by a second cloud server paired with the hub node, where the device control instruction is an instruction transmitted by the control device to the second cloud server".

In another embodiment, referring to FIG. 7, the hub node may transmit a device control instruction to a second cloud server paired with the hub node, and the second cloud server may transmit the device control instruction to a first cloud server paired with the target controlled device. Further, the first cloud server may transmit the device control instruction to the target controlled device, so that the target controlled device may receive the device control instruction transmitted by the hub node. Specifically, the step of "receiving the device control instruction transmitted by the hub node" may include:

receiving a device control instruction transmitted by a first cloud server paired with the target controlled device, where the device control instruction is an instruction transmitted by the hub node to the first cloud server via a second cloud server, and the second cloud server is a cloud server paired with the hub node.

Similarly, the first cloud server paired with the target controlled device may be a cloud server of the same Internet of Things system to which the target controlled device belongs. In addition, in the present application, the hub node may include a control device, and a step of "receiving a device control instruction transmitted by a first cloud server paired with the target controlled device, where the device control instruction is an instruction transmitted by the hub node to the first cloud server via a second cloud server, and the second cloud server is a cloud server paired with the hub node" can be accomplished by the target controlled device in cooperation with the control device, i.e., "receiving a device control instruction transmitted by a first cloud server paired with the target controlled device, where the device control instruction is an instruction transmitted by the control device to the first cloud server via a second cloud server, and the second cloud server is a cloud server paired with the control device".

In another alternative embodiment, referring to FIG. 8, the target controlled device may establish a control connection relationship with the hub node, so that a device control instruction transmitted by the hub node may be received based on the control connection relationship. Specifically, the step of "receiving a device control instruction transmitted by the hub node" can include:

establishing a control connection relationship with the hub node, where the control connection relationship is configured for the hub node to perform device control for the target controlled device; and receiving a device control instruction transmitted by the hub node based on the control connection relationship.

It should be noted that the control connection relationship established here is a connection relationship in a control process. Specifically, a process in which the hub node performs device control for the target controlled device may include both configuration and control. The control refers to a process in which the hub node performs device control for the target controlled device. For example, the hub node may control the target controlled device by transmitting a device control instruction to the target controlled device.

In the present application, the control may be directly performed after the configuration is completed. If the connection relationship established in the configuration process is valid, the target controlled device may continue using the connection relationship established in the configuration process, and receive a device control instruction transmitted by the hub node based on the connection relationship.

If the connection relationship is invalid, or the hub node does not directly control the target controlled device after the configuration is completed, but controls the target controlled device after the configuration is completed and the connection relationship is invalid, the target controlled device may establish a control connection relationship with the hub node so that the device control instruction transmitted by the hub node may be received based on the control connection relationship.

It should be noted in the present application that the hub node may include a control device, and the steps of "establishing a control connection relationship with the hub node, where the control connection relationship is used for the hub node to perform device control for the target controlled device; and receiving a device control instruction transmitted by the hub node based on the control connection relationship" can be accomplished by the target controlled device in cooperation with the control device, that is, "establishing a control connection relationship with the control device, where the control connection relationship is used for the control device to perform device control for the target controlled device; and receiving a device control instruction transmitted by the control device".

There are multiple manners in which the target controlled device may establish the control connection relationship with the hub node. For example, since the device control information of the hub node obtained by the target controlled device may include an object identification of the device control object and connection key information corresponding to the device control object, the control connection relationship with the hub node may be established based on the object identification and the connection key information. Specifically, the step of "establishing the control connection relationship with the hub node" can include:

establish the control connection relationship with the hub node based on the object identification and the connection key information.

For example, the target controlled device and the hub node may perform security negotiation with the objection identification and the connection key information to establish an encrypted connection, so as to establish a control connection relationship between the target controlled device and the hub node. It should be noted that the method for establishing the control connection relationship herein may be the same as or different from the method for establishing the connection relationship in the configuration process in the foregoing description, which is not limited in the present application.

It should be noted in the present application that the hub node may include a control device, and the step of "establishing the control connection relationship with the hub node based on the object identification and the connection key information" can be accomplished by the target controlled device in cooperation with the control device, that is, "establishing a control connection relationship with the control device based on the object identification and the connection key information".

In some embodiments, since there may be a plurality of hub nodes in different Internet of things systems that have set their device control authorities to the target controlled device in consideration of a practical application, and there may be a plurality of hub nodes requesting to establish the control connection relationship with the target controlled device in the control process and the target controlled device should establish the control connection relationship with the configured hub nodes, the target controlled device may determine a target hub node from the plurality of hub nodes and establish the control connection relationship with the target hub node. Specifically, the device control information of the hub node obtained by the target controlled device may further include a system identification of an Internet of Things system to which the second Internet of Things object belongs, i.e., a target system identification of the target Internet of Things system, and a target device identification allocated by the target Internet of Things system for the target controlled device in addition to the object identification of the device control object and the connection key information corresponding to the device control object. Specifically, the step of "establishing a control connection relationship with the hub node based on the object identification and the connection key information" can include:

obtaining a control connection request of the hub node, wherein the control connection request comprises a hub system identification, and the hub system identification is a device identification of an Internet of things system to which the hub node belongs; and in response to the hub system identification matching the target system identification, establishing the control connection relationship with the hub node based on the target device identification, the object identification, and the connection key information.

The control connection request obtained by the target controlled device is data requesting to establish a control connection relationship with the target controlled device. The control connection request may include a hub system identification, where the hub system identification is a system identification of the Internet of things system to which the hub node transmitting the control connection request belongs. Data formats of the control connection request may include a variety of data formats, such as a broadcast packet, a multicast packet, or the like.

In the control process, the target controlled device may obtain a plurality of control connection requests, which may be transmitted by the hub nodes of the different Internet of things systems to the target controlled device. The target controlled device may compare a hub system identification corresponding to each of the control connection requests with the target system identification, and if the hub system identification matches the target system identification, it may be determined that the hub node transmitting the control connection request is the configured hub node along with the target controlled device, and the target controlled device may further establish a control connection relationship with the hub node based on the target device identification, the object identification, and the connection key information.

It should be noted in the present application that the hub node may include a control device, and the steps of "obtaining a control connection request of a hub node, where the control connection request includes a hub system identification, and the hub system identification is a device identification of an Internet of things system to which the hub node belongs; and if the hub system identification matches the target system identification, establishing a control connection relationship with the hub node based on the target device identification, the object identification, and the connection key information" can be accomplished by the target controlled device in cooperation with the control device, that is, "obtaining a control connection request of the control device, where the control connection request includes a hub system identification, and the hub system identification is a device identification of an Internet of things system to which the hub node belongs; and if the hub system identification matches the target system identification, establishing a control connection relationship with the control device based on the target device identification, the object identification, and the connection key information".

As an example, in a local area network, the hub node may transmit a multicast or broadcast packet by means of a multicast packet or the like, so as to transmit a control connection request to the target controlled device, where the control connection request includes a hub system identification being a device identification of an Internet of things system to which the hub node belongs, and a format of the packet is agreed in advance. Accordingly, the target controlled device can obtain the control connection request of the hub node. If the hub system identification matches the target system identification, the target controlled device may further establish a control connection relationship with the hub node based on the target device identification, the object identification, and the connection key information. Specifically, the step of "establishing a control connection relationship with the hub node based on the target device identification, the object identification, and the connection key information" may include:

generating device connection response information of the control connection request, where the device connection response information comprises the target device identification; and transmitting the device connection response information to the hub node to establish the control connection relationship with the hub node based on the object identification and the connection key information.

As an example, after obtaining the control connection request of the hub node, the target controlled device may determine the Internet of things system to which the hub node transmitting the control connection request belongs based on the hub system identification included in the control connection request, and the target controlled device may determine the device ID allocated by the Internet of things system for the target controlled device, and generate device connection response information including the device ID.

Further, the target controlled device may transmit the device connection response information to the hub node, so that the hub node learns identity of the target controlled device with which the hub node establishes a control connection relationship. As such, the target controlled device may further establish the control connection relationship with the hub node based on the object identification and the connection key information.

After the connection relationship between the target controlled device and the hub node is established, the target controlled device can receive the device control instruction transmitted by the hub node based on the control connection relationship. As an example, after the control connection relationship between the target controlled device and the hub node is established, i.e., a control connection channel for data interaction between the target controlled device and the hub node may be established, the target controlled device and the hub node may perform data interaction via the control connection channel, for example, transmitting a device control instruction and receiving the device control instruction.

In the present application, after receiving the device control instruction transmitted by the hub node, the target controlled device may execute an operation corresponding to the device control instruction.

For example, the device control instruction may include a service calling instruction, where the service calling instruction may be used to call a service provided by the target controlled device. Thus, the target controlled device may receive the service calling instruction transmitted by the hub node and call a service corresponding to the service calling instruction to implement device control of the hub node to the target controlled device.

It should be noted in the present application that the hub node may include a control device, and the steps of "generating device connection response information of the control connection request, where the device connection response information includes the target device identification; and transmitting the device connection response information to the hub node to establish a control connection relationship with the hub node based on the object identification and the connection key information" can be accomplished by the target controlled device in cooperation with the control device, that is, "generating device connection response information of the control connection request, where the device connection response information includes the target device identification; and transmit the device connection response information to the control device to establish a control connection relationship with the control device based on the object identification and the connection key information".

For another example, the device control instruction may include an information changing instruction, where the information changing instruction may be used to change device control information stored by the target controlled device. For example, the information changing instruction may be used to modify the ACL of the target controlled device, for example, may be used to modify authority information stored in the ACL, and may be used to update connection key information stored in the ACL, or the like. Specifically, the step of "executing an operation corresponding to the device control instruction" can include:

determining a device control object corresponding to the device control instruction; and in response to the device control object having an information changing authority for the target controlled device, executing an information changing operation corresponding to the information changing instruction.

There may be a plurality of manners in which the target controlled device determines the device control object corresponding to the device control instruction. For example, the target controlled device may receive the device control request transmitted by the hub node, where the device control request may include the device control instruction and the object identification of the device control object, so that the target controlled device may determine the device control object corresponding to the device control instruction based on the object identification.

Further, the target controlled device may determine whether the device control object has an information changing authority, for example, by interrogating the device control information stored by the target controlled device, such as, by interrogating the ACL of the target controlled device. Specifically, if the device control object has the information changing authority for the target controlled device, the target controlled device may execute an information changing operation corresponding to the information changing instruction.

As an example, the device control object of the hub node may be an access management device F whose an object attribute is an administrator. That is, the access management device F has the information changing authority for the target controlled device. In this example, the access management device F may periodically transmit a device control instruction to the target controlled device, where the device control instruction may include an ACL packet and an object identification of the access management device F, and the ACL packet is used for the target controlled device to update its ACL.

After receiving the device control instruction, the target controlled device may extract the object identification from the device control instruction, and may interrogate the ACL to know that the device control object corresponding to the device control instruction is the access management device F, and the object attribute of the access management device F is the administrator. Therefore, the target controlled device may determine that the access management device F has the information changing authority for the target controlled device, and in this case, the target controlled device may perform the information changing operation corresponding to the information changing instruction based on the ACL packet, that is, update the ACL.

As can be seen from above that the present embodiment can receive a device capability request transmitted by a hub node that has established a connection relationship with a target controlled device, where the target controlled device and the hub node belong to different Internet of Things systems; responsive to the device capability request, return device capability information of the target controlled device to the hub node, where the device capability information is configured to instruct the hub node to generate device control information for the target controlled device; receive device control information transmitted by the hub node; and set authority information of the hub node for the target controlled device based on the device control information.

The solution can enable the hub node of the different Internet of Things system than the Internet of Things system to which the target controlled device belongs to set the device control authority of the hub node for the target controlled device, thereby implementing device control in a scenario across the Internet of Things systems. Specifically, the solution establishes a connection relationship between the target controlled device and the hub node, so that the hub node can obtain the device capability information of the target controlled device based on the connection relationship, generate device control information for setting the authority information, and set the device control authority of the hub node for the target controlled device with the device control information. As such, the solution can support that the target controlled device is controlled by a local hub device such as a third-party application, a smart sound box, a gateway, a smart television, or a router, so that the interconnection and intercommunication between the target controlled devices across the Internet of Things systems are improved.

In addition, compared with the protocol interconnection or standardization between one cloud and another cloud or between an end and one cloud, the solution avoids the problem that the performance and the stability of the protocol interconnection or standardization between one cloud and another cloud are not high due to the long data link, and improves the problem that the device manufacturer of the protocol interconnection or standardization between an end and one cloud is less motivated and difficult to push because the target controlled device cannot access the cloud of the device manufacturer. Therefore, the solution can further improve the interconnection and intercommunication between the target controlled devices across the Internet of Things systems without affecting the target controlled devices being connected to the cloud of the device manufacturer at a low cost.

In accordance with the methods described in the above embodiments, further details are given below by way of example. The details will be described from the perspective of the hub node in this embodiment.

As shown in FIG. 9, a method for setting a device control authority includes steps 201-203 as follows.

At step 201, device capability information of a target controlled device that has established a connection relationship with a hub node may be obtained.

It should be noted in the present that the hub node may include a configuration device, the step "obtaining device capability information of a target controlled device that has established a connection relationship with a hub node" can be accomplished by the target controlled device in cooperation with the configuration device, that is, "triggering the configuration device to obtain device capability information of the target controlled device that has established a connection relationship with the configuration device".

There may be multiple manners in which the hub node may obtain the device capability information of the target controlled device. For example, a connection relationship between the hub node and the target controlled device can be established and the device capability information can be obtained based on the connection relationship. Specifically, the step of "obtaining device capability information of a target controlled device that has established a connection relationship with a hub node" may include:

establishing a connection relationship between the hub node and the target controlled device, where the hub node and the target controlled device belong to different Internet of Things systems; and obtaining the device capability information of the target controlled device based on the connection relationship.

It should be noted in the present application that the hub node may include a configuration device, and the steps of "establishing a connection relationship between the hub node and the target controlled device, where the hub node and the target controlled device belong to different Internet of Things systems; and obtaining device capability information of the target controlled device based on the connection relationship" can be accomplished by the target controlled device in cooperation with the configuration device, that is, "establishing a connection relationship between the configuration device and the target controlled device, where the configuration device and the target controlled device belong to different Internet of Things systems; and obtaining device capability information of the target controlled device based on the connection relationship".

In some embodiments, the hub node may request the target controlled device to establish a connection relationship between the hub node and the target controlled device by transmitting connection interrogation information to the target controlled device. Specifically, the step of "establishing a connection relationship between the hub node and the target controlled device" can include:

generating connection interrogation information meeting a preset interrogation format;

transmitting the connection interrogation information to the target controlled device to receive interrogation response information transmitted by the target controlled device based on the connection interrogation information, where the interrogation response information comprises device information of the target controlled device; and establishing the connection relationship between the hub node and the target controlled device based on the device information.

As an example, the hub node may generate connection interrogation information, which may be specifically in the form of a packet being a pre-agreed preset interrogation format. The hub node may transmit a multicast packet or a broadcast packet in the local area network by means of the multicast packet or the like, so as to transmit the connection interrogation information to the target controlled device.

Further, the hub node may receive interrogation response information transmitted by the target controlled device based on the connection interrogation information, where the interrogation response information may be specifically in the form of a packet being a pre-agreed interrogation response format, and the interrogation response information includes device information of the target controlled device.

In a practical application, it is considered that the hub node may establish a connection relationship with a plurality of Internet of Things devices and thus control the Internet of Things devices, that is, the hub node may transmit connection interrogation information to the plurality of Internet of Things devices, and accordingly, the hub node may receive interrogation response information returned by the plurality of Internet of Things devices. Therefore, the hub node may determine the identity of respective one of the Internet of Things devices with which the hub node will establish a connection relationship based on the device information in the interrogation response information received by the hub node.

It should be noted in the present application that the hub node can include a configuration device, and the steps of "generating connection interrogation information meeting a preset interrogation format; transmitting the connection interrogation information to the target controlled device to receive interrogation response information transmitted by the target controlled device based on the connection interrogation information, where the interrogation response information includes device information of the target controlled device; and establishing a connection relationship between the hub node and the target controlled device based on the device information" can be accomplished by the target controlled device in cooperation with the configuration device, i.e. "generating connection interrogation information meeting a preset interrogation format; transmitting the connection interrogation information to the target controlled device to receive interrogation response information transmitted by the target controlled device based on the connection interrogation information, where the interrogation response information includes device information of the target controlled device; and establishing a connection relationship between the hub node and the target controlled device based on the device information".

After determining the identity of the target controlled device with which the hub node will establish a connection relationship, the hub node can establish a connection relationship with the target controlled device. There may be a number of ways of establishing the connection relationship between the target controlled device and the hub node. For example, the connection relationship can be implemented by exchanging a key, for example, by exchanging a Personal Identification Number (PIN) code. Specifically, the step of "establishing the connection relationship between the hub node and the target controlled device based on the device information" can include:

obtaining connection verification information of the target controlled device based on the device information; and establishing the connection relationship between the hub node and the target controlled device based on the connection verification information.

The connection verification information is related information to be verified upon establishing the connection relationship between the hub node and the target controlled device in the configuration process. Specifically, if verification of the connection verification information is passed, the connection relationship between the hub node and the target controlled device can be further established. Otherwise, the connection relationship between the hub node and the target controlled device is not established. For example, the connection verification information may be key information, such as a PIN code.

There may be multiple manners in which the hub node may obtain the connection verification information of the target controlled device based on the device information of the target controlled device. For example, the connection verification information may be input by a user. Specifically, the hub node may, after obtaining the device information of the target controlled device, prompt the user that the target controlled device is to be networked with the hub node and thus require the user to perform out-of-band confirmation by inputting a PIN code or scanning a two-dimensional code, or the like.

In some embodiments, the user may transmit the connection verification information of the target controlled device to the hub node after determining the connection verification information of the target controlled device, so that the hub node can obtain the connection verification information. There are multiple manners in which the user may determine the connection verification information of the target controlled device. For example, the user may view fixed connection verification information in the device package of the target controlled device. For another example, the user may obtain the connection verification information of the target controlled device via a first Internet of Things APP paired with the target controlled device. For example, the user may obtain the connection verification information generated by the first Internet of Things APP, or interrogate the connection verification information of the target controlled device via the first Internet of Things APP. Alternatively, if the connection verification information is generated by the first Internet of Things APP, the first Internet of Things APP may transmit the connection verification information to the target controlled device via the first cloud server.

It should be noted in the present application that the hub node may include a configuration device, and the steps of "obtaining connection verification information of the target controlled device based on the device information; and establishing a connection relationship between the hub node and the target controlled device based on the connection verification information" can be accomplished by the target controlled device in cooperation with the configuration device, i.e. "obtaining connection verification information of the target controlled device based on the device information; and establish a connection relationship between the configuration device and the target controlled device based on the connection verification information".

In the present embodiment, there may be multiple manners in which the user obtains the connection verification information of the target controlled device. For example, the user may directly interact at the hub node to transmit the connection verification information of the target controlled device to the hub node. Specifically, the step of "obtaining the connection verification information of the target controlled device" may include:

obtaining connection verification information of the target controlled device responsive to an information inputting operation for the hub node.

An information input operation for the hub node may be a specific touch operation, such as a long-press operation, a double-click operation, a slide operation, or the like. The information input operation for the hub node may further be a non-touch operation, such as a voice trigger operation, an image detection trigger operation, a program trigger operation, or the like. Alternatively, the information input operation for the hub node may be a combination of a series of operations, which is not limited in the present embodiment.

For example, the hub node may include a physical control through which a user may perform an information input operation to input connection verification information of the target controlled device; for another example, the hub node may include a display screen on which a user may input connection verification information of a target controlled device by performing a touch operation or scanning a code; for another example, the hub node may include a voice interaction module, and the user may perform an information input operation for the hub node by performing voice interaction with the hub node, thereby inputting connection verification information of the target controlled device; for another example, the hub node may include an image recognition module, and the user may transmit an image including the connection verification information to the hub node so that the hub node may recognize the connection verification information of the target controlled device through the image recognition module; for another example, the user may transmit the connection verification information of the target controlled device to the hub node through a near field communication technology; and so on.

It should be noted in the present application that the hub node may include a configuration device, and the steps of "obtaining connection verification information of the target controlled device responsive to an information inputting operation for the hub node" can be accomplished by the target controlled device in cooperation with the configuration device, i.e. "obtaining connection verification information of the target controlled device responsive to an information inputting operation for the configuration".

In another embodiment, the user may further transmit the connection verification information of the target controlled device to the hub node. Specifically, the step of "obtaining the connection verification information of the target controlled device" may include:

obtaining connection verification information transmitted by a target client, where the target client is a client matching the hub node, and the connection verification information is connection verification information corresponding to the target controlled device.

As an example, the target client may be a second Internet of Things app, and the user may, after determining the connection verification information of the target controlled device, input the connection verification information into the second Internet of Things app, and transmit the connection verification information to the hub node via the second Internet of Things app, so that the hub node may obtain the connection verification information of the target controlled device.

It should be noted in the present application that the hub node may include a configuration device, and the step of "obtaining connection verification information transmitted by a target client, where the target client is a client matching the hub node, and the connection verification information is connection verification information corresponding to the target controlled device" can be accomplished by the target controlled device in cooperation with the configuration device, i.e. "obtaining connection verification information transmitted by a target client, where the target client is a client matching the configuration device, and the connection verification information is connection verification information corresponding to the target controlled device".

In the present application, after the connection relationship between the hub node and the target controlled device is established, the device authentication information of the target controlled device can be further obtained based on the connection relationship.

Specifically, the step of "obtaining the device capability information of the target controlled device based on the connection relationship" can include:

generating a device capability request for the target controlled device to transmit the device capability request to the target controlled device based on the connection relationship; and receiving device capability information returned by the target controlled device based on the device capability request.

In order to ensure the security of the data interaction, the hub node and the target controlled device may make an agreement on a format of the device capability request, so that the hub node may request to obtain a capability model of the target controlled device by generating a device capability request meeting a preset agreement format and transmitting the device capability request to the target controlled device.

As an example, referring to FIG. 4, the hub node may be a third party local hub, and the target controlled device may be an IoT device, where the third party local hub may generate a device capability request for the IoT device in a pre-agreed format and transmit the device capability request to the IoT device. Further, the third party local hub may receive device capability information returned by the IoT device based on the device capability request, where the device capability information may specifically include a specific model, a type, a controllable instruction, an attribute, a service, and the like of the IoT device.

It should be noted in the present application that the hub node can include a configuration device, and the steps of "generating a device capability request for the target controlled device to transmit the device capability request to the target controlled device based on the connection relationship; and receiving device capability information returned by the target controlled device based on the device capability request" can be accomplished by the target controlled device in cooperation with the configuration device.

Alternatively, in some embodiments, the target controlled device and the hub node may be authenticated by a connection relationship established between the target controlled device and the hub node, and when the authentication is passed, the hub node only transmits data to the target controlled device, for example, a device capability request. Specifically, the step of "transmitting a device capability request to the target controlled device based on the connection relationship" may include:

authenticating the target controlled device based on the connection relationship; and in response to the authentication being passed, transmitting the device capability request to the target controlled device.

In the present application, the target controlled device is authenticated by the hub node, and the hub node may be used to determine an identity of the target controlled device, and, if the authentication is passed, to transmit a device capability request to the target controlled device. For example, the device capability request may be transmitted to the target controlled device based on the established connection relationship.

It should be noted that this step may be an optional step, that is, the hub node may not authenticate the target controlled device after establishing the connection relationship with the target controlled device. In this case, the hub node trusts all target controlled devices approved by the user.

It should be noted in the present application that the hub node may include a configuration device, and the steps of "authenticating the target controlled device based on the connection relationship; and if the authentication is passed, transmitting the device capability request to the target controlled device" can be accomplished by the target controlled device in cooperation with the configuration device.

There are multiple manners in which the hub node may authenticate the target controlled device. For example, the identify authentication is performed on the target controlled device with the certificate authentication; for another example, the identify authentication is performed on the target controlled device with the key authentication; for another example, the identify authentication is performed on the target controlled device with challenging authentication; and so on. Specifically, the step of "authenticating the target controlled device based on the connection relationship" may include:

performing certificate authentication or key authentication on the target controlled device based on the connection relationship.

It should be noted in the present application that the hub node may include a configuration device, and the steps of "performing certificate authentication or key authentication on the target controlled device based on the connection relationship" can be accomplished by the target controlled device in cooperation with the configuration device.

At step 202, device control information of the hub node for the target controlled device may be generated based on the device capability information.

There may be multiple manners of generating the device control information for the target controlled device based on the device capability information. For example, the device control information of the hub node for the target controlled device may be generated based on the device capability information for the target controlled device, where the device control information is the device control information bound to the hub node, for example, the device control information bound to the device identification of the hub node. In this case, the device control information of the hub node for the target controlled device may also remain unchanged even if the device control object for performing device control of the target controlled device via the hub node is changed.

It should be noted in the present application that the hub node may include an access management device, and the step of "generating device control information of the hub node for the target controlled device based on the device capability information" can be accomplished by the target controlled device in cooperation with the access management device, that is, "triggering the access management device to generate the device control information of the access management device to the target controlled device based on the device capability information".

For another example, in a practical application, considering that the hub node can be used as a physical medium via which different device control objects controls the target controlled device, and the different device control objects have different device control requirements for the target controlled device, it is possible to generate device control information corresponding to each of different device control objects for the hub node based on the device capability information of the target controlled device in the Internet of things system to which the hub node belongs. Specifically, the step of "generating device control information for the target controlled device based on the device capability information" may include:

determining a device control object of the hub node, where the device control object is an object that controls the target controlled device via the hub node; and generating device control information of the device control object in a target Internet of Things system for the target controlled device based on the device capability information, where the target Internet of Things system is an Internet of Things system to which the hub node belongs.

There may be multiple manners of determining the device control object for the hub node. For example, the device control object for the hub node may be determined by interacting the second Internet of Things system with the Internet of Things system to which the hub node belongs, i.e., the target Internet of Things system; for another example, the device control object for the hub node may be determined by interacting the user with the second Internet of Things system; for another example, the device control object for the hub node may be determined by the hub node based on current device data of the hub node; and so on.

In a practical application, the hub node may allocate different object identification to different device control objects in the target Internet of Things system. For example, the third party local hub may allocate different subject IDs to different controllers, users, etc., within its own ecology.

It should be noted in the present application that the hub node may include an access management device, and the steps of "determining a device control object of the hub node, where the device control object is an object that controls the target controlled device via the hub node; and generating device control information of the device control object in a target Internet of Things system for the target controlled device based on the device capability information, where the target Internet of Things system is an Internet of Things system to which the hub node belongs" can be accomplished by the target controlled device in cooperation with the access management device, that is, "triggering the access management device to determine a device control object of the hub node, where the device control object is an object that controls the target controlled device via the hub node; and generating device control information of the device control object in a target Internet of Things system for the target controlled device based on the device capability information, where the target Internet of Things system is an Internet of Things system to which the hub node belongs".

After the device control object of the hub node is determined, the device control information of the device control object in the target Internet of Things system for the target controlled device can be further generated based on the device capability information.

For example, the hub node may determine, based on the device capability information of the target controlled device, a service accessible to the hub node and an authority for the accessible service in services provided by the target controlled device to determine the service accessing information of the device control object. Further, the device control information of the device control object in the target Internet of Things system for the target controlled device can be further generated based on the service accessing information of the device control object. Specifically, the step of "generating device control information of the device control object in a target Internet of Things system for the target controlled device based on the device capability information" may include:

determining a service provided by the target controlled device based on the device capability information;
determining service accessing information of the device control object to the service; and
generating device control information of the device control object in the target Internet of Things system for the target controlled device based on the service accessing information.

The service provided by the target controlled device can be determined based on the device capability information. As an example, device capability information of the intelligent air conditioner can be used to determine services provided by intelligent air conditioner, including a refrigeration service, a heating service, a dehumidification service, a self-cleaning service, and the like.

There may be multiple manners of determining the service accessing information of the device control object. For example, the service accessing information of the device control object may be determined by interacting the second Internet of Things system with the Internet of Things system to which the hub node belongs, i.e., the target Internet of Things system; for another example, the service accessing information of the device control object may be determined by interacting the user with the second Internet of Things system; for another example, the service accessing information of the device control object may be determined by the hub node based on current device data of the hub node; and so on.

The hub node may add the system identification of the target Internet of Things system, the object identification of the device control object, and the service accessing information of the device control object into the device control information of the hub node to generate the device control information of the device control object in the target Internet of Things system for the target controlled device. In this case, after obtaining the device control information, the target controlled device can correspondingly set the device control authority of the device control object in the target Internet of Things system for the target controlled device based on the system identification and the object identification.

For example, the third party local hub may add an ecological identification code of the third party local hub, the object identification of the device control object, and the service accessing information into the device control information of the third party local hub to generate the device control information of the device control object in the ecology in which the third party local hub is located to the IoT device, where the service accessing information may include an accessible service and an authority for the service. In this case, after obtaining the device control information, the IoT device may set the device control authority of the device control object in the ecology for the IoT device based on the ecological identification code and the subject ID.

It should be noted in the present application that the hub node may include an access management device, and the steps of "determining a service provided by the target controlled device based on the device capability information; determining service accessing information of the device control object to the service; and generating device control information of the device control object in a target Internet of Things system for the target controlled device based on the service accessing information" can be accomplished by the target controlled device in cooperation with a configuration device, that is, "triggering the access management device to determine a service provided by the target controlled device based on the device capability information; determine service accessing information of the device control object to the service; and generate device control information of the device control object in a target Internet of Things system for the target controlled device based on the service accessing information".

In a practical application, it is considered that the device control object may have an information changing authority for the target controlled device in addition to the service calling authority for the target controlled device. Accordingly, the hub node may correspondingly set the information into the device control information, for example, may set the information by the object attribute information of the device control object. In this way, the hub node can set the object attribute of the device control object so that the target controlled device learns whether the device control object has the information changing authority. Specifically, the step of "generating device control information of the device control object in the target Internet of Things system for the target controlled device" can include:

determining object attribute information of the device control object; and generating device control information of the device control object in the target Internet of Things system for the target controlled device based on the object attribute information.

Similarly, there may be multiple manners of determining object attribute information of the device control object. For example, the object attribute information of the device control object may be determined by interacting the second Internet of Things system with the Internet of Things system to which the hub node belongs, i.e., the target Internet of Things system; for another example, the object attribute information of the device control object may be determined by interacting the user with the second Internet of Things system; for another example, the object attribute information of the device control object may be determined by the hub node based on current device data of the hub node; and so on.

As an example, the hub node further adds object attribute information of the device control object into the device control information of the hub node to generate device control information of the device control object in the target Internet of Things system for the target controlled device. In this case, after obtaining the device control information, the target controlled device can correspondingly determine whether the device control object has an information changing authority for the target controlled device based on the object attribute information.

For example, the third party local hub may further add role information of the device control object into the device control information of the third party local hub to generate the device control information of the device control object in the ecology in which the third party local hub is located to the IoT device. In this case, after obtaining the device control information, the IoT device may determine whether the device control object has an information changing authority for the IoT device based on the object attribute information.

In a practical application, the device control information generated by the hub node may further include information such as a device ID, a connection key, and a key expiration time of the connection key, in addition to a system identification of a second Internet of Things system, a subject ID of the device control object, object attribute information, and service accessing information.

It should be noted in the present application that the hub node can include an access management device, and the steps of "determining object attribute information of the device control object; and generating device control information of the device control object in the target Internet of Things system for the target controlled device based on the object attribute information" can be accomplished by the target controlled device in cooperation with the access management device, that is, "triggering the configuration device to determine object attribute information of the device control object; and generate device control information of the device control object in the target Internet of Things system for the target controlled device based on the object attribute information."

At step 203, the device control information is transmitted to the target controlled device, where the device control information is configured to instruct the target controlled device to set a control authority, the control authority being a device control authority of the hub node for the target controlled device.

It should be noted in the present application that the hub node can include an access management device, and the steps of "transmitting the device control information to the target controlled device, where the device control information is configured to instruct the target controlled device to set a control authority, the control authority being a device control authority of the hub node for the target controlled device" can be accomplished by the target controlled device in cooperation with the access management device, that is, "triggering the access management device to transmit the device control information to the target controlled device, where the device control information is configured to instruct the target controlled device to set a control authority, the control authority being a device control authority of the hub node for the target controlled device".

In some embodiments, the hub node may include a configuration device and an access management device, and the configuration device may be configured to establish a connection relationship with the target controlled device via the foregoing steps, and the access management device may be configured to establish a connection relationship between the access management device and the target controlled device via the configuration device, so that the device control information can be further transmitted to the target controlled device based on the connection relationship. Specifically, the step of "transmitting the device control information to the target controlled device" may include:

establishing an access connection relationship between the access management device and the target controlled device via the configuration device; and transmitting the device control information to the target controlled device based on the access connection relationship.

The step of "establishing an access connection relationship between the access management device and the target controlled device" may be first described below.

There may be a plurality of manners of establishing an access connection relationship between the access management device and the target controlled device via the configuration device. For example, the target controlled device trusted by the configuration device may be directly configured as a device trusted by the access management device, and then the access connection relationship between the access management device and the target controlled device may be established.

For another example, in some embodiments, data transmission may be performed by the configuration device, so that the access management device may transmit related information of the access management device to the target controlled device via the configuration device, and thus the target controlled device determines whether the access connection relationship with the access management device is established. Specifically, the step of "establishing an access connection relationship between the access management device and the target controlled device via the configuration device" may include:

transmitting communication address information of the access management device to the target controlled device via the configuration device; and establishing the access connection relationship between the access management device and the target controlled device based on the communication address information.

In the present application, there may be a plurality of manners that the configuration device may transmit the communication address information of the access management device to the target controlled device. For example, the configuration device may directly transmit the communication address information of the access management device to the target controlled device, so that the target controlled device obtains the communication address information of the access management device transmitted by the configuration device.

In the present application, there may be a plurality of manners that the configuration device may transmit the communication address information of the access management device to the target controlled device. For example, the configuration device may directly transmit related information required for verifying the access management device to the target controlled device, so that the target controlled device may further, after obtaining the information, determine whether the communication address information transmitted by the access management device is obtained from at least one candidate access management device by performing steps such as device finding and device verification. Specifically, the step of "transmitting communication address information of the access management device to the target controlled device via the configuration device" can include:

transmitting device verification information of the access management device to the target controlled device via the configuration device, where the device verification information is configured for the target controlled device to verify the access management device; and transmitting communication address information of the access management device to the target controlled device based on the device verification information.

The device verification information transmitted by the configuration device is related information required for the target controlled device to verify the access management device. Specifically, since the configuration device has established a connection relationship with the target controlled device, alternatively, the configuration device has further authenticated the target controlled device, the configuration device may be a device trusted by the target controlled device.

The device verification information transmitted by the configuration device may be in a variety of forms, for example, may be a character string, a value, or a collection and the like.

Since the configuration device and the access management device belong to the same Internet of things system, the configuration device and the access management device may be the same Internet of things device in the same Internet of things system or different Internet of things devices in the same Internet of things system. If the configuration device and the access management device are the same Internet of things device in the same Internet of things system, the configuration device may be considered as a device trusted by the access management device. If the configuration device and the access management device are the different Internet of things devices in the same Internet of things system, the configuration device and the access management device may establish a trust relationship between the configuration device and the access management device through internal data interaction in the same Internet of things system, such as internal authorization. As such, the configuration device may be considered as a device trusted by the access management device.

Therefore, the configuration device can be configured as a device that is trusted by both the access management device and the target controlled device, and the configuration device may transmit the device verification information of the access management device to the target controlled device, so that the target controlled device may subsequently verify at least one candidate access management device based on the device verification information to determine whether the communication address information transmitted by the access management device is obtained.

As an example, the system identification of the target Internet of things system may be determined as the device verification information, where the target Internet of things system is an Internet of things system to which the access management device belongs. In a practical application, the system identification of the target Internet of things system may also be referred to as an ecological identification code of the target Internet of things system, which may be used to uniquely identify a third party manufacturer. For another example, a format of the device verification information may be predetermined, and the access management device may generate data meeting the format, and use the data as the device verification information.

In the present embodiment, the access management device may transmit its device verification information to the configuration device to transmit the device verification information to the target controlled device via the configuration device, so that the target controlled device can obtain the device verification information of the access management device transmitted by the configuration device, where the device verification information transmitted by the configuration device can be used for the target controlled device to verify at least one candidate access management device.

In this way, when there may be further at least one candidate access management device transmitting the communication address information to the target controlled device in addition to the access management device, the access management device can enable the target controlled device to determine to obtain the communication address information of the access management device from the plurality of access management devices by virtue of the device verification information of the access management device.

As an example, the access management device may transmit the device verification information and the communication address information of the access management device to the target controlled device. In this case, when the target controlled device verifies the device verification information transmitted by the access management device based on the device verification information transmitted by the configuration device, the verification result of the access management device is that the verification is passed. In this case, the access management device may transmit the communication address information to the target controlled device based on the device verification information. There may be multiple manners in which the access management device may transmit the device verification information and the communication address information to the target controlled device. For example, the access management devices may actively transmit the device verification information and the communication address information to the target controlled device. For another example, the access management device may transmit the device verification information and the communication address information to the target controlled device in response when the target controlled device initiates the device finding. Specifically, the step of "transmitting communication address information of the access management device to the target controlled device based on the device verification information" can include:
  receiving device finding information transmitted by the target controlled device based on the device verification information; and
  generating response information for the device finding information to transmit the response information to the target controlled device, where the response information includes connection verification information and communication address information of the access management device.

As an example, the target controlled device may generate device finding information, for example, a device finding packet, based on the device verification information transmitted by the configuration device, and the target controlled device may transmit the device finding information over a local area network in a broadcast manner, a multicast manner, or the like within the local area network. Accordingly, the access management device may receive device finding information transmitted by the target controlled device based on the device verification information and generate response information for the device finding information, where the response information includes connection verification information and communication address information of the access management device, and further the access management device may transmit the response information to the target controlled device.

In the present application, after the configuration device transmits communication address information of the access management device to the target controlled device, the access management device can further establish an access connection relationship with the target controlled device based on the communication address information.

The step of "transmitting device control information to the target controlled device based on the access connection relationship" can be further described below after describing the step of "establishing the access connection relationship between the access management device and the target controlled device via the configuration device".

It should be noted alternatively that, after the access connection relationship between the access management device and the target controlled device is established, the access management device can further perform identify authentication on the target controlled device and, after the authentication is passed, further transmit the device control information to the target controlled device based on the access connection relationship. Specifically, the step of "transmitting device control information to the target controlled device based on the access connection relationship" can include:
  authenticating the target controlled device based on the access connection relationship; and
  in response to the authentication being passed, transmitting the device control information to the target controlled device.

The target controlled device is authenticated on a basis of establishing the access connection relationship between the target controlled device and the access management device for the access management device to further perform identity verification on the target controlled device, thereby improving security of data interaction.

In the present application, there may be multiple manners in which the access management device authenticates the target controlled device, for example, through certificate authentication, challenging authentication, key authentication, or the like.

In some embodiments, the hub node may further include an access authentication device in addition to the access management device, and the access management device authenticates the target controlled device and may delegate the access authentication device to perform the authentication. Specifically, the step of "authenticating the target controlled device" may include:
  authenticating the target controlled device via the access authentication device.

In the present application, considering that the target controlled device may, before receiving the device control information transmitted by the access management device, have a need to authenticate the access management module, the access management device may transmit the authentication verification information to the target controlled device before transmitting the device control information to the target controlled device, so that the target controlled device may authenticate the access management device based on the authentication verification information. Specifically, before the step of "transmitting the device control instruction to the target controlled device", method for setting the device control authority can further include:
  determining device authentication information of the access management device, where the device authentication information is configured for the target controlled device to authenticate the access management device; and
  transmitting the device authentication information to the target controlled device.

There may be multiple manners in which the access management device transmits the device authentication information to the target controlled device. For example, after the access connection relationship between the access management device and the target controlled device is established, i.e., a connection channel for data interaction between the access management device and the target controlled device may be established, the access management device and the target controlled device may perform data interaction via the connection channel, for example, transmitting device authentication information and receiving the device authentication information.

As an example, the step of "determining device authentication information of the access management device" can include:
  obtaining an authentication request transmitted by the target controlled device; and
  generating device authentication information of the access management device based on the authentication request.

There may be multiple manners in which the access management device obtains the authentication request transmitted by the target controlled device. For example, the access management device may obtain the authentication request transmitted by the target controlled device based on the access connection relationship established between the access management device and the target controlled device.

Further, the access management device may generate authentication verification information based on the received authentication request.

In some embodiments, the hub node may include an access authentication device, and the access authentication device may perform a related step of authenticating the access management device. Specifically, the step of "generating device authentication information of the access management device based on the authentication request" may include:

transmitting the authentication request to the access authentication device; and triggering the access authentication device to generate device authentication information of the access management device based on the authentication request.

As an example, a manner in which the target controlled device authenticates the access management device may be performed by the certificate authentication, and the device authentication information transmitted by the access management device to the target controlled device may be specifically a certificate. An example in which the authentication verification information required for the target controlled device to authenticate the access management device is an ecological identification code, and the device authentication information transmitted by the access management device to the target controlled device is a certificate may be taken. Specifically, after receiving the authentication request transmitted by the target controlled device, the access management device may transmit the authentication request to the access authentication device to trigger the access authentication device to generate a corresponding certificate based on the authentication request, where the certificate is a certificate issued by a trusted CA and matched with the ecological identification code. As such, the target controlled device can determine that a verification result of the certificate is that the verification is passed, that is, the authentication result of the access management device is that the authentication is passed. Otherwise, the target controlled device may determine that the verification result of the certificate is that the verification fails, that is, the authentication result of the access management device is that the authentication fails.

In some embodiments, the step "in response to the authentication being passed, transmitting the device control information to the target controlled device" can include:

in response to the authentication being passed, receiving device information transmitted by the target controlled device to perform device registration with the target controlled device; and transmitting device control information to the target controlled device based on a registration result.

Further, the access management device may transmit the device control information to the target controlled device based on the registration result. In a practical application, there may be multiple manners of transmitting the device control information to the target controlled device based on the registration result. For example, if the registration is successful, the access management device may transmit the device control information to the target controlled device. Otherwise, the access management device may not transmit the device control information to the target controlled device.

For another example, after the target controlled device performs device registration with the access management device, device control information is transmitted to the target controlled device. That is, the access management device can transmit the device control information to the target controlled device as long as the target controlled device requests to perform device registration with the access management device, regardless of whether the registration result is successful or not.

As an example, referring to FIG. 5, after the IoT device completes authentication of the access management module, the IoT device transmits its own device information to the access management module for device registration. The device information may specifically include information such as a device type and a binding code. Further, the access management device may transmit the device control information to the IoT device after the IoT device is successfully registered.

In the present embodiment, the process of setting the device control authority is described above from the perspective of the hub node. In a practical application, the device control may be further performed on the basis of the foregoing process. Specifically, the method for setting the device control authority may further include:

transmitting a device control instruction to the target controlled device to perform device control for the target controlled device via the device control instruction.

It should be noted in the present application that the hub node can include a control device, and the step of "transmitting a device control instruction to the target controlled device to perform device control for the target controlled device via the device control instruction" can be accomplished by the target controlled device in cooperation with the control device, i.e., "triggering the control device to transmit a device control instruction to the target controlled device to perform device control for the target controlled device via the device control instruction".

In the present application, there may be a plurality of manners that the hub node can transmit a device control instruction to the target controlled device. For example, the step of "transmitting the device control instruction to the target controlled device" can include:

transmitting a device control instruction to a second cloud server to transmit the device control instruction to the target controlled device via the second cloud server, where the second cloud server is a cloud server paired with the hub node.

It should be noted in the present application that the hub node can include a control device, and the step of "transmitting a device control instruction to a second cloud server to transmit the device control instruction to the target controlled device via the second cloud server, where the second cloud server is a cloud server paired with the hub node" can be accomplished by the target controlled device in cooperation with the control device, i.e., "triggering the control device to transmit a device control instruction to a second cloud server to transmit the device control instruction to the target controlled device via the second cloud server, where the second cloud server is a cloud server paired with the hub node".

For another example, the step of "transmitting the device control instruction to the target controlled device" can include:

transmitting a device control instruction to a second cloud server to transmit the device control instruction to a first cloud server via the second cloud server and transmit the device control instruction to the target controlled device via the first cloud server, where the second cloud server is a cloud server paired with the hub node, and the first cloud server is a cloud server paired with the target controlled device.

It should be noted in the present application that the hub node can include a control device, and the step of "transmitting a device control instruction to a second cloud server to transmit the device control instruction to a first cloud server via the second cloud server and transmit the device control instruction to the target controlled device via the first cloud server, where the second cloud server is a cloud server paired with the hub node, and the first cloud server is a cloud server paired with the target controlled device" can be accomplished by the target controlled device in cooperation with the control device, i.e., "triggering the control device to transmit a device control instruction to a second cloud server to transmit the device control instruction to a first cloud server via the second cloud server and transmit the device control instruction to the target controlled device via the first cloud server, where the second cloud server is a cloud server paired with the hub node, and the first cloud server is a cloud server paired with the target controlled device".

For another embodiment, referring to FIG. 8, the hub node may establish a control connection relationship with the target controlled device, so that a device control instruction can be transmitted to the target controlled device based on the control connection relationship. Specifically, the step of "transmitting a device control instruction to the target controlled device" can include:

establishing a control connection relationship with the target controlled device, where the control connection relationship is configured for the hub node to perform device control for the target controlled device; and transmitting a device control instruction to the target controlled device based on the control connection relationship.

It should be noted in the present application that the hub node can include a control device, and the steps of "establishing a control connection relationship with the target controlled device, where the control connection relationship is used for the hub node to perform device control for the target controlled device; and transmitting a device control instruction to the target controlled device based on the control connection relationship" can be accomplished by the target controlled device in cooperation with the control device, i.e., "triggering the control device to establish a control connection relationship with the target controlled device, where the control connection relationship is used for the hub node to perform device control for the target controlled device; and transmitting a device control instruction to the target controlled device based on the control connection relationship".

There may be multiple manners in which the hub node may establish the control connection relationship with the target controlled device. For example, since the device control information transmitted by the hub node to the target controlled device may include an object identification of the device control object and connection key information corresponding to the device control object, the control connection relationship with the target controlled device may be established based on the object identification and the connection key information. Specifically, the step of "establishing the control connection relationship with the target controlled device" can include:

establish a connection relationship with the target controlled device based on the object identification and the connection key information.

It should be noted that the method for establishing the control connection relationship herein may be the same as or different from the method for establishing the connection relationship in the configuration process in the foregoing description, which is not limited in the present application.

It should be noted in the present application that the hub node can include a control device, and the step of "establishing a connection relationship with the target controlled device based on the object identification and the connection key information" can be accomplished by the target controlled device in cooperation with the control device, i.e. "Triggering the control device to establish a connection relationship with the target controlled device based on the object identification and the connection key information".

In some embodiments, since it is considered in a practical application that the hub node may have set its device control authorities to a plurality of Internet of Things devices across different Internet of Things systems, and the hub node may request to establish a control connection relationship with each of the plurality of Internet of Things devices and correspondingly receive control connection response information returned by the Internet of Things device in the process of control, where the control connection response information may include a first device identification corresponding to the Internet of Things device. Therefore, when the hub node wants to establish a control connection relationship between the hub node and the target Internet of Things device, the hub node may determine whether the Internet of Things device transmitting the control connection response information is a target Internet of Things device by comparing the target device identification of the target Internet of Things device with the first device identification in the control connection response information, so that the control connection relationship between the hub node and the target Internet of Things device can be further established. Specifically, the device control information transmitted by the hub node to the target controlled device may further include a system identification of an Internet of Things system to which the hub node belongs, i.e., a target system identification of the target Internet of Things system, and a target device identification allocated by the target Internet of Things system for the target controlled device in addition to the object identification of the device control object and the connection key information corresponding to the device control object. Specifically, the step of "establishing a connection relationship with the target controlled device based on the object identification and the connection key information" can include:

generating a control connection request to transmit the control connection request to the target controlled device, where the control connection request comprises the target system identification;

receiving control connection response information transmitted by the target controlled device, where the control connection response information comprises a first device identification corresponding to the target controlled device; and in response to the first device identification matching the target device identification, establishing a control connection relationship with the target controlled device based on the object identification and the connection key information.

The control connection request generated by the hub node is used to request to establish a control connection relationship between the hub node and the target controlled device. The control connection request may include a target system identification, where the target system identification is the system identification of the Internet of Things system to which the hub node generating the control connection request belongs. Data forms of the control connection request may include a variety of data forms, such as a multicast packet, a broadcast packet.

In the process of controlling the target controlled device via the hub node, the hub node may generate a control connection request and transmit the control connection request to the target controlled device. Therefore, the hub node may transmit a control connection request to a plurality of target controlled devices, and correspondingly, the hub node may receive control connection response information from different target controlled devices, where the control connection response information includes a first device identification corresponding to the target controlled devices. The hub node may compare the first device identification corresponding to each piece of control connection response information with the target device identification. If the first device identification and the target device identification match each other, it may be determined that the target controlled device transmitting the control connection response information is the target controlled device with which the hub node wants to establish a control connection relationship. The hub node can further establish a control connection relationship with the target controlled device based on the object identification and the connection key information.

As an example, the hub node may transmit a multicast or broadcast packet by means of a multicast packet or the like within a local area network, so as to transmit a control connection request to the target controlled device, where the control connection request includes a target system identification being a device identification of an Internet of things system to which the hub node belongs, and a format of the packet is agreed in advance. Accordingly, the target controlled device can obtain the control connection request and return control connection response information including the first device identification corresponding to the target controlled device to the hub node. The hub node may compare the first device identification with the target device identification, and if the first device identification and the target device identification are matched with each other, the hub node may further establish a control connection relationship with the target controlled device based on the object identification and the connection key information.

After the control connection relationship with the target controlled device has been established, the hub node can transmit a device control instruction to the target controlled device based on the control connection relationship.

It should be noted in the present application that the hub node can include a control device, and the steps of "generating a control connection request to transmit the control connection request to the target controlled device, where the control connection request includes the target system identification; receiving control connection response information transmitted by the target controlled device, where the control connection response information includes a first device identification corresponding to the target controlled device; and establishing a control connection relationship with the target controlled device based on the object identification and the connection key information if the first device identification matches the target device identification" can be accomplished by the target controlled device in cooperation with the control device, i.e., "generating a control connection request to transmit the control connection request to the target controlled device, where the control connection request includes the target system identification; receiving control connection response information transmitted by the target controlled device, where the control connection response information includes a first device identification corresponding to the target controlled device; and establishing a control connection relationship with the target controlled device based on the object identification and the connection key information if the first device identification matches the target device identification".

Specifically, the step of "transmitting the device control instruction to the target controlled device" can include:
  determining a device control object of the target controlled device;
  in response to the device control object having an information changing authority for the target controlled device, generating a device control instruction based on the information changing authority; and
  transmitting the device control instruction to the target controlled device.

There may be multiple manners in which the hub node determines the device control object of the hub node. For example, the device control object of the hub node may be determined by interacting the hub node with the Internet of Things system to which the hub node belongs, i.e., the target Internet of Things system; for another example, the device control object of the hub node may be determined by interacting the user with the hub node; for another example, the device control object of the hub node may be determined by the hub node based on current device data of the hub node; and so on.

Further, the hub node may determine whether the device control object has an information changing authority, for example, based on an object attribute of the device control object. Specifically, if the device control object has an information changing authority for the target controlled device, then the hub node can generate a device control instruction based on the information changing authority, for example, an information changing instruction, and transmit the device control instruction to the target controlled device, so the hub node can change the device control information stored in the target controlled device with the device control instruction.

As an example, the device control object of the hub node may be an access management device F whose an object attribute is an administrator. That is, the access management device F has the information changing authority for the target controlled device. In this example, the access management device F may periodically generate a device control instruction and transmit the device control instruction to the target controlled device, where the device control instruction may include an ACL packet and an object identification of the access management device F, the object identification is used for the target controlled device to determine whether the access management device F has the information changing authority, and the ACL packet is used for the target controlled device to update its ACL.

It should be noted in the present application that the hub node can include an access management device, and the steps of "determining a device control object of the target controlled device; if the device control object has an information changing authority for the target controlled device, generating a device control instruction based on the information changing authority; and transmitting the device control instruction to the target controlled device" can be accomplished by the target controlled device in cooperation with the access management device, i.e., "triggering the access management device to determine a device control object of the target controlled device; if the device control object has an information changing authority for the target controlled device, generate a device control instruction based on the information changing authority; and transmit the device control instruction to the target controlled device".

In the embodiments of the present application, the description of each of the embodiments has its own emphasis. For a part not described in detail in the explanation of a certain step or a certain term in a certain embodiment, reference may be made to the above detailed description of the method for setting the device control authority, which is not repeatedly described herein.

As can be seen from the above that the present embodiment can enable the hub node of the different Internet of Things system than the Internet of Things system to which the target controlled device belongs to set the device control authority of the hub node for the target controlled device, thereby implementing device control in a scenario across the Internet of Things systems. Specifically, the solution establishes a connection relationship between the target controlled device and the hub node, so that the hub node can obtain the device capability information of the target controlled device based on the connection relationship, generate device control information for setting the authority information, and set the device control authority of the hub node for the target controlled device with the device control information. As such, the present embodiment can support that the target controlled device is controlled by a local hub device such as a third-party application, an intelligent sound box, a gateway, an intelligent television, or a router, so that the interconnection and intercommunication between the target controlled devices across the Internet of Things systems are improved.

In addition, compared with the protocol interconnection or standardization between one cloud and another cloud or between an end and one cloud, the present embodiment avoids the problem that the performance and the stability of the protocol interconnection or standardization between one cloud and another cloud are not high due to the long data link, and improves the problem that the device manufacturer of the protocol interconnection or standardization between an end and one cloud is less motivated and difficult to push because the target controlled device cannot access the cloud of the device manufacturer. Therefore, the present embodiment can further improve the interconnection and intercommunication between the target controlled devices across the Internet of Things systems without affecting the target controlled devices being connected to the cloud of the device manufacturer at a low cost.

In accordance with the methods described in the above embodiments, further details are given below by way of example.

An example in which a terminal is specifically integrated in the first setting device, for example, an Internet of Things device and another terminal is specifically integrated in the second setting device, for example, a hub node is taken for illustration in the present embodiment.

The hub node can include at least one Internet of Things device. As an example, the hub node may specifically include following Internet of Things devices: a configuration device, an access management device, an access authentication device, a control device, and the like.

Specifically, the configuration device may be used to configure the hub device and the target controlled device. For example, the configuration device may be a terminal running an Internet of Things client, an intelligent sound box, or the like. The access management device may be used to manage access of the target controlled device to the hub node. For example, the access management device may be an intelligent sound box or the like. The access authentication device may be used to authenticate the hub node and the target controlled device. For example, the access authentication device may be an intelligent sound box or the like. The control device may be used to control the target controlled device. For example, the control device may be an intelligent sound box or the like.

As shown in FIG. 10, a method for setting a device control authority includes steps 301-3015 as follows.

At step 301, a connection relationship between a target controlled device and a configuration device may be established.

At step 302, the configuration device may transmit device capability request to the target controlled device based on the connection relationship.

At step 303, the target controlled device may transmit device capability information to the configuration device responsive to the device capability request.

At step 304, an access connection relationship between the access management device and the target controlled device may be established.

At step 305, the target controlled device may transmit an authentication request to the access management device based on the access connection relationship.

At step 306, the access authentication device may generate device authentication information of the access management device based on the authentication request.

At step 307, the access management device transmits the device authentication information to the target controlled device, where the device authentication information is generated by the access authentication device.

At step 308, the target controlled device may verify the device authentication information to authenticate the access management device.

At step 309, if the authentication may be passed, then the target controlled device may transmit device information of the target controlled device to the access management device.

At step 3010, the access management device may register the target controlled device based on the device information.

At step 3011, the access management device may transmit device control information to the target controlled device based on a registration result.

At step 3012, the target controlled device may set authority information of the hub node for the target controlled device based on the device control information.

At step 3013, a control connection relationship between the target controlled device and the control device may be established.

At step 3014, the control device may transmit a device control instruction to the target controlled device.

At step 3015, the target controlled device may perform an operation corresponding to the device control instruction.

The embodiments of the present application may extend an application scenario in which the hub node controls the target controlled device across the Internet of things systems. Specifically, in the embodiments of the present application, the hub node may be divided and decoupled according to functions to obtain Internet of things devices such as the configuration device, the access management device, the access authentication device, and the control device. In this way, it is possible to allocate resources required for controlling the devices across the Internet of things systems to an Internet of things device in at least one hub node, thereby greatly relieving the data processing burden of the Internet of things device in each hub node.

The embodiments of the present application can establish the connection relationship between the target controlled device and the configuration device, so that the configuration device can obtain device capability information of the target controlled device based on the connection relationship. Further, the target controlled device can establish the access connection relationship between the target controlled device and the access management device, and perform device authentication and device registration based on the access connection relationship, where the hub node delegates the related steps of the device authentication to the access authentication device to perform the authentication. Finally, in the embodiments of the present application, the control device transmits the device control instruction to the target controlled device, so that the target controlled device executes the operation corresponding to the device control instruction, thereby realizing control of the hub node to the target controlled device.

As such, the solution can support that the target controlled device is controlled by a local hub device such as a third-party application, an intelligent sound box, a gateway, an intelligent television, or a router, so that the interconnection and intercommunication between the target controlled devices across the Internet of Things systems are improved.

In addition, compared with the protocol interconnection or standardization between one cloud and another cloud or between an end and one cloud, the present embodiment avoids the problem that the performance and the stability of the protocol interconnection or standardization between one cloud and another cloud are not high due to the long data link, and improves the problem that the device manufacturer of the protocol interconnection or standardization between an end and one cloud is less motivated and difficult to push because the Internet of Things device cannot access the cloud of the device manufacturer. Therefore, the solution can further improve the interconnection and intercommunication between the Internet of Things devices across the Internet of Things systems without affecting the Internet of Things devices being connected to the cloud of the device manufacturer at a low cost.

In order to better implement the above methods, another embodiment of the present application further provides an apparatus for setting a device control authority (i.e., a first setting device), where the first setting device can be integrated in a terminal.

For example, as shown in FIG. 11, the apparatus for setting the device control authority may include a request receiving unit 401, a response unit 402, an information receiving unit 403, and an authority setting unit 404 as follows.

The request receiving unit 401 is configured to receive a device capability request transmitted by a hub node that has established a connection relationship with a target controlled device, where the target controlled device and the hub node belong to different Internet of Things systems.

The response unit 402 is configured to, responsive to the device capability request, return device capability information of the target controlled device to the hub node, where the device capability information is configured to instruct the hub node to generate device control information for the target controlled device.

The information receiving unit 403 is configured to receive device control information transmitted by the hub node.

The authority setting unit 404 is configured to set authority information of the hub node for the target controlled device based on the device control information.

In some embodiments, the hub node includes a configuration device, and the request receiving unit 401 may include:

a request receiving subunit that can be configured to receive a device capability request transmitted by the configuration device that has established a connection relationship with the target controlled device.

The response unit 402 may include:

a response subunit that can be configured to, responsive to the device capability request, return device capability information of the target controlled device to the configuration device.

In some embodiments, the request receiving unit 401 may include:

a first connection establishing subunit that can be configured to establish a connection relationship between the target controlled device and the hub node; and a capability receiving subunit that can be configured to receive the device capability request transmitted by the hub node based on the connection relationship.

In some embodiments, the first connection establishing subunit can be configured to:

receive connection interrogation information transmitted by the hub node; and if information format of the connection interrogation information meets a preset interrogation format, establish a connection relationship between the target controlled device and the hub node.

In some embodiments, the first connection establishing subunit can be specifically configured to:

generate interrogation response information of the connection interrogation information, where the interrogation response information includes device information of the target controlled device; and transmit the interrogation response information to the hub node to establish a connection relationship between the target controlled device and the hub node based on the device information.

In some embodiments, the capability receiving subunit can be configured to:

authenticate the hub node based on the connection relationship; and if the authentication is passed, receive the device capability request transmitted by the hub node.

In some embodiments, the capability receiving subunit can be specifically configured to:

perform certificate authentication or key authentication on the hub node based on the connection relationship.

In some embodiments, the response unit 402 may include:

a capability determining subunit that can be configured to determine device capability information of the target controlled device; and a capability returning subunit that can be configured to, responsive to the device capability request, return device capability information of the target controlled device to the hub node to trigger the hub node to generate device control information for the target controlled device based on the device capability information.

In some embodiments, the hub node includes a configuration device and an access management device, where the configuration device has established a connection relationship with the target controlled device; and the information receiving unit 403 may include:

a second connection establishing subunit that can be configured to establish an access connection relationship with the access management device via the configuration device; and a control information receiving subunit that can be configured to receive device control information transmitted by the access management device based on the access connection relationship.

In some embodiments, the second connection establishing subunit can be configured to:
obtain communication address information of the access management device via the configuration device; and
establish an access connection relationship with the access management device based on the communication address information.

In some embodiments, the second connection establishing subunit can be specifically configured to:
obtain communication address information of the access management device transmitted by the configuration device.

In some embodiments, the second connection establishing subunit can be specifically configured to:
obtain device verification information of the access management device transmitted by the configuration device, where the device verification information transmitted by the configuration device is configured to verify the access management device; and obtain communication address information transmitted by the access management device based on the device verification information transmitted by the configuration device.

In some embodiments, the second connection establishing subunit can be specifically configured to:
obtain device verification information and communication address information transmitted by each of candidate access management devices; verify the device verification information of the candidate access management device based on the device verification information transmitted by the configuration device; if the verification is passed, determine that the communication address information transmitted by the candidate access management device is communication address information transmitted by the access management device.

In some embodiments, the second connection establishing subunit can be specifically configured to:
generate device finding information to transmit the device finding information to candidate access management devices; and obtain response information generated by each of the candidate access management devices based on the device finding information, where the response information includes device verification information and communication address information of the candidate access management device.

In some embodiments, the control information receiving subunit can be configured to:
authenticate the access management device based on the access connection relationship; and if the authentication is passed, receive device control information transmitted by the access management device.

In some embodiments, the control information receiving subunit can be specifically configured to:
obtain authentication verification information of the access management device transmitted by the configuration device; and authenticate the access management device with the authentication verification information.

In some embodiments, the control information receiving subunit can be specifically configured to:
obtain device authentication information transmitted by the access management device; and verify the device authentication information with the authentication verification information to authenticate the access management device.

In some embodiments, the control information receiving subunit can be specifically configured to:
generate an authentication request to transmit the authentication request to the access management device; and obtain device authentication information returned by the access management device responsive to the authentication request, where the device authentication information is generated by the access authentication device, and the access authentication device and the access management device belong to the same Internet of things system.

In some embodiments, the control information receiving subunit can be specifically configured to:
if the authentication is passed, transmit device information of the target controlled device to the access management device to perform device registration with the access management device; and receive device control information transmitted by the access management device based on a registration result.

In some embodiments, the hub node includes a control device, and the authority setting unit 404 may include:
a first authority setting subunit that can be configured to set authority information of the control device for the target controlled device based on the device control information.

In some embodiments, the hub node includes an access management device, and the authority setting unit 404 can include:
a second authority setting subunit that can be configured to set an information changing authority of the access management device for the target controlled device based on the device control information, where the information changing authority represents a changing authority of the access management device for the device control information stored in the target controlled device.

In some embodiments, the device control information includes a system identification of a target Internet of Things system and an object identification of a device control object, where the target Internet of Things system is an Internet of Things system to which the hub node belongs, and the device control object is an object that controls the target controlled device via the hub node; and the authority setting unit 404 may include:
a third authority setting subunit that can be configured to set a device control authority of the device control object in the target Internet of Things system for the target controlled device based on the system identification and the object identification.

In some embodiments, the device control information further includes object attribute information of the device control object; and the third authority setting subunit can be configured to:
determine a service calling authority of the device control object to the target controlled device based on the object attribute information, where the service calling authority is a calling authority of the device control object for a service provided by the target controlled device, and the service provided by the target controlled device is determined based on the device capability information of the target controlled device; and set a device control authority of the device control object in the target Internet of Things system for the target controlled device based on the service calling authority.

In some embodiments, the third authority setting subunit can be specifically configured to:

if the object attribute information indicates that the device control object has an information changing authority to the target controlled device, set a device control authority of the device control object in the target Internet of Things system for the target controlled device based on the information changing authority and the service calling authority, where the information changing authority represents a changing authority of the device control object for the device control information stored in the target controlled device.

In some embodiments, the apparatus for setting the device control authority may further include:

an instruction receiving unit that can be configured to receive a device control instruction transmitted by the hub node, where the device control instruction is used for the hub node to perform device control for the target controlled device; and an operation execution unit that can be configured to execute an operation corresponding to the device control instruction.

In some embodiments, the instruction receiving unit may include:

a first instruction receiving subunit that can be configured to receive a device control instruction transmitted by a first cloud server paired with the target controlled device, where the device control instruction is an instruction transmitted by the hub node to the first cloud server via a second cloud server, and the second cloud server is a cloud server paired with the hub node.

In some embodiments, the instruction receiving unit may include:

a second instruction receiving subunit that can be configured to receive a device control instruction transmitted by a second cloud server paired with the hub node, where the device control instruction is an instruction transmitted by the hub node to the second cloud server.

In some embodiments, the instruction receiving unit may include:

a second connection establishing subunit that can be configured to establish a control connection relationship with the hub node, where the control connection relationship is used for the hub node to perform device control for the target controlled device; and a third instruction receiving subunit that can be configured to receive a device control instruction transmitted by the hub node based on the control connection relationship.

In some embodiments, the device control information includes an object identification of a device control object and connection key information corresponding to the device control object, where the device control object is an object that controls the target controlled device via the hub node; and the second connection establishing subunit can be configured to:

establish the control connection relationship with the hub node based on the object identification and the connection key information.

In some embodiments, the device control information includes a target system identification of a target Internet of Things system and a target device identification allocated by the target Internet of Things system for the target controlled device, where the target Internet of Things system is an Internet of Things system to which the hub node belongs; and the second connection establishing subunit can be specifically configured to:

obtaining a control connection request of a hub node, where the control connection request includes a hub system identification, and the hub system identification is a device identification of an Internet of things system to which the hub node belongs; and if the hub system identification matches the target system identification, establishing a control connection relationship with the hub node based on the target device identification, the object identification, and the connection key information.

In some embodiments, the second connection establishing subunit can be specifically configured to:

generate device connection response information of the control connection request, where the device connection response information includes the target device identification; and transmit the device connection response information to the hub node to establish a control connection relationship with the hub node based on the object identification and the connection key information.

In some embodiments, the device control instruction includes an information changing instruction, and the operation execution unit may include:

an object determining subunit that can be configured to determine a device control object corresponding to the device control instruction; and an operation execution subunit that can be configured to execute an information changing operation corresponding to the information changing instruction if the device control object has an information changing authority for the target controlled device.

As can be seen from the above, in the apparatus for setting the device control authority of the present embodiment, the request receiving unit 401 receives the device capability request transmitted by the hub node that has established a connection relationship with the target controlled device, where the target controlled device and the hub node belong to the different Internet of Things systems; the response unit 402 returns the device capability information of the target controlled device to the hub node in response to the device capability request, where the device capability information is configured to instruct the hub node to generate device control information for the target controlled device; the information receiving unit 403 receives device control information transmitted by the hub node; and the authority setting unit 404 sets the authority information of the hub node for the target controlled device based on the device control information.

The solution can enable the hub node of the different Internet of Things system than the Internet of Things system to which the target controlled device belongs to set the device control authority of the hub node for the target controlled device, thereby implementing device control in a scenario across the Internet of Things systems. Specifically, the solution establishes a connection relationship between the target controlled device and the hub node, so that the hub node can obtain the device capability information of the target controlled device based on the connection relationship, generate device control information for setting the authority information, and set the device control authority of the hub node for the target controlled device with the device control information. As such, the solution can support that the target controlled device is controlled by a local hub device such as a third-party application, an intelligent sound box, a gateway, an intelligent television, or a router, so that the interconnection and intercommunication between the target controlled devices across the Internet of Things systems are improved.

In addition, compared with the protocol interconnection or standardization between one cloud and another cloud or between an end and one cloud, the solution avoids the problem that the performance and the stability of the protocol interconnection or standardization between one cloud and another cloud are not high due to the long data link, and improves the problem that the device manufacturer of the protocol interconnection or standardization between an end and one cloud is less motivated and difficult to push because the target controlled device cannot access the cloud of the device manufacturer. Therefore, the solution can further improve the interconnection and intercommunication between the target controlled devices across the Internet of Things systems without affecting the target controlled devices being connected to the cloud of the device manufacturer at a low cost.

In order to better implement the above methods, another embodiment of the present application further provides an apparatus for setting a device control authority (i.e., a second setting device), where the second setting device can be integrated in a terminal.

For example, as shown in FIG. 12, the apparatus for setting the device control authority may include a capability obtaining unit 501, an information generating unit 502, and an information transmitting unit 503 as follows.

The capability obtaining unit 501 is configured to obtain device capability information of a target controlled device that has established a connection relationship with a hub node.

The information generating unit 502 is configured to generate device control information of the hub node for the target controlled device based on the device capability information.

The information transmitting unit 503 is configured to transmit the device control information to the target controlled device, where the device control information is configured to instruct the target controlled device to set a control authority, the control authority being a device control authority of the hub node for the target controlled device.

In some embodiments, the hub node includes a configuration device, and the capability obtaining unit 501 may include:
a first capability obtaining subunit that can be configured to trigger the configuration device to obtain device capability information of the target controlled device that has established a connection relationship with the configuration device.

In some embodiments, the capability obtaining unit 501 may include:
a first connection establishing subunit that can be configured to establish a connection relationship between the hub node and the target controlled device, where the hub node and the target controlled device belong to different Internet of Things systems; and
a second capability obtaining subunit that can be configured to obtain device capability information of the target controlled device based on the connection relationship.

In some embodiments, the first connection establishing subunit can be configured to:
generate connection interrogation information meeting a preset interrogation format; transmit the connection interrogation information to the target controlled device to receive interrogation response information transmitted by the target controlled device based on the connection interrogation information, where the interrogation response information includes device information of the target controlled device; and establish a connection relationship between the hub node and the target controlled device based on the device information.

In some embodiments, the first connection establishing subunit can be specifically configured to:
obtain connection verification information of the target controlled device based on the device information; and establish a connection relationship between the hub node and the target controlled device based on the connection verification information.

In some embodiments, the first connection establishing subunit can be specifically
obtain connection verification information of the target controlled device responsive to an information inputting operation for the hub node.

In some embodiments, the first connection establishing subunit can be specifically configured to:
obtain connection verification information transmitted by a target client, where the target client is a client matching the hub node, and the connection verification information is connection verification information corresponding to the target controlled device.

In some embodiments, the second capability obtaining subunit can be configured to:
generate a device capability request for the target controlled device to transmit the device capability request to the target controlled device based on the connection relationship;
and receive device capability information returned by the target controlled device based on the device capability request.

In some embodiments, the second capability obtaining subunit can be specifically configured to:
authenticate the target controlled device based on the connection relationship; and if the authentication is passed, transmit the device capability request to the target controlled device.

In some embodiments, the second capability obtaining subunit can be specifically configured to:
perform certificate authentication or key authentication on the target controlled device based on the connection relationship.

In some embodiments, the hub node includes an access management device, and the information generating unit 502 may include:
a first information generating subunit that can be configured to trigger the access management device to generate device control information of the access management device to the target controlled device based on the device capability information to transmit the device control information to the target controlled device.

In some embodiments, the information generating unit 502 may include:
an object determining subunit that can be configured to determine a device control object of the hub node, where the device control object is an object that controls the target controlled device via the hub node; and
a second information generating subunit that can be configured to generate device control information of the device control object in a target Internet of Things system for the target controlled device based on the device capability information, where the target Internet of Things system is an Internet of Things system to which the hub node belongs.

In some embodiments, the second information generating subunit can be configured to:

determine a service provided by the target controlled device based on the device capability information; determine service accessing information of the device control object to the service; and generate device control information of the device control object in a target Internet of Things system for the target controlled device based on the service accessing information.

In some embodiments, the second information generating subunit can be specifically configured to:

determine object attribute information of the device control object; and generate device control information of the device control object in the target Internet of Things system for the target controlled device based on the object attribute information.

In some embodiments, the hub node includes a configuration device and an access management device, where the configuration device has established a connection relationship with the target controlled device; and the information transmitting unit 503 may include:

a second connection establishing subunit that can be configured to establish an access connection relationship between the access management device and the target controlled device via the configuration device; and an information transmitting subunit that can be configured to transmit device control information to the target controlled device based on the access connection relationship.

In some embodiments, the second connection establishing subunit can be configured to:

transmit communication address information of the access management device to the target controlled device via the configuration device; and establish an access connection relationship between the access management device and the target controlled device based on the communication address information.

In some embodiments, the second connection establishing subunit can be obtain communication address information of the access management device via the configuration device; and trigger the configuration device to transmit the communication address information to the target controlled device.

In some embodiments, the second connection establishing subunit can be specifically configured to:

transmit device verification information of the access management device to the target controlled device via the configuration device, where the device verification information is used for the target controlled device to verify the access management device; and transmit communication address information of the access management device to the target controlled device based on the device verification information.

In some embodiments, the second connection establishing subunit can be specifically configured to:

receive device finding information transmitted by the target controlled device based on the device verification information; and generate response information for the device finding information to transmit the response information to the target controlled device, where the response information includes connection verification information and communication address information of the access management device.

In some embodiments, the information transmitting subunit can be configured to:

authenticate the target controlled device based on the access connection relationship; and if the authentication is passed, transmit the device control information to the target controlled device.

In some embodiments, the hub node further includes an access authentication device, and the information transmitting subunit can be specifically configured to:

authenticate the target controlled device via the access authentication device.

In some embodiments, before the transmitting the device control information to the target controlled device, the information transmitting subunit can be further configured to:

determine device authentication information of the access management device, where the device authentication information is used for the target controlled device to authenticate the access management device; and transmit the device authentication information to the target controlled device.

In some embodiments, the information transmitting subunit can be further obtain an authentication request transmitted by the target controlled device; and generate device authentication information of the access management device based on the authentication request.

In some embodiments, the hub node further includes an access authentication device, and the information transmitting subunit is further specifically configured to: transmit the authentication request to the access authentication device; and trigger the access authentication device to generate device authentication information of the access management device based on the authentication request.

In some embodiments, the information transmitting subunit can be specifically configured to:

if the authentication is passed, receive device information transmitted by the target controlled device to perform device registration with the target controlled device; and transmit device control information to the target controlled device based on a registration result.

In some embodiments, the apparatus for setting the device control authority may further include:

an instruction transmitting unit that can be configured to transmit a device control instruction to the target controlled device to perform device control for the target controlled device via the device control instruction.

In some embodiments, the instruction transmitting unit may include:

a first instruction transmitting subunit that can be configured to transmit a device control instruction to a second cloud server to transmit the device control instruction to the target controlled device via the second cloud server, where the second cloud server is a cloud server paired with the hub node.

In some embodiments, the instruction transmitting unit may include:

a second instruction transmitting subunit that can be configured to transmit a device control instruction to a second cloud server to transmit the device control instruction to a first cloud server via the second cloud server and transmit the device control instruction to the target controlled device via the first cloud server, where the second cloud server is a cloud server paired with the hub node, and the first cloud server is a cloud server paired with the target controlled device.

In some embodiments, the instruction transmitting unit may include:

a third connection establishing subunit that can be configured to establish a control connection relationship with the target controlled device, where the control connection relationship is used for the hub node to perform device control for the target controlled device; and a third instruction transmitting subunit that can be configured to transmit device control instruction to the target controlled device based on the control connection relationship.

In some embodiments, the device control information includes an object identification of a device control object and connection key information corresponding to the device control object, where the device control object is an object that controls the target controlled device via the hub node; and the third connection establishing subunit can be configured to:

establish a connection relationship with the target controlled device based on the object identification and the connection key information.

In some embodiments, the device control information includes a target system identification of a target Internet of Things system and a target device identification allocated by the target Internet of Things system for the target controlled device, where the target Internet of Things system is an Internet of Things system to which the hub node belongs; and the third connection establishing subunit can be specifically configured to:

generate a control connection request to transmit the control connection request to the target controlled device, where the control connection request includes the target system identification; receive control connection response information transmitted by the target controlled device, where the control connection response information includes a first device identification corresponding to the target controlled device; and establish a control connection relationship with the target controlled device based on the object identification and the connection key information if the first device identification matches the target device identification.

In some embodiments, the third instruction transmitting subunit can be configured to:

determine a device control object of the target controlled device; if the device control object has an information changing authority for the target controlled device, generate a device control instruction based on the information changing authority; and transmit the device control instruction to the target controlled device.

The apparatus for setting the device control authority provided by any one of the embodiments of the present application can set a device control authority of the hub node of a different Internet of Things system than an Internet of Things system to which the target controlled device belongs for the target controlled device, thereby efficiently performing device control of the target controlled device.

In addition, another embodiment of the present application further provides a computer device, which may be a device such as a terminal. As shown in FIG. 13, which shows a schematic structural diagram of the computer device according to some embodiments of the present application.

The computer device may include components such as a memory 601 including one or more computer readable storage media, an input unit 602, a processor 603 including one or more processing cores, and a power supply 604. It should be understood by those skilled in the art that the structure of the computer device shown in FIG. 13 should be not constituted to be a limitation on the computer device, and may include more or less components than illustrated, or may combine certain components, or different component arrangements.

The memory 601 may be used to store software programs and modules, and the processor 603 executes various functional applications and data processing by running the software programs and modules stored in the memory 601. The memory 601 may mainly include a storage program area and a storage data area, where the storage program area may store an operating system, a computer program (such as a sound play function, an image play function, and the like) required by at least one function, and the like; and the storage data area may store data (such as audio data, a phone book, and the like) created according to use of a computer device, and the like. In addition, memory 601 may include a high speed random access memory, and may also include a non-volatile memory, such as at least one magnetic disk storage device, a flash memory device, or other volatile solid state storage device. Correspondingly, the memory 601 may further include a memory controller to provide access to the memory 601 by the processor 603 and the input unit 602.

The input unit 602 can be configured to receive input number or character information and to generate keyboard, mouse, joystick, optical or trajectory ball signal inputs related to a user's setting and functional control. In detail, in a specific embodiment, the input unit 602 can include a touch-sensitive surface and other input devices. The touch-sensitive surface, also called a touch display screen or a touch panel, can be configured to detect touch operations of a user on or near the touch-sensitive surface (for example, operations carried out by the user through any suitable objects or attachments, such as a finger, a touch pen and the like, on the touch-sensitive surface or near the touch-sensitive surface) and to drive a corresponding device connected therewith according to a preset program. Optionally, the touch-sensitive surface can include a touch detection device and a touch controller. The touch detection device detects the touch direction of the user, detects a signal caused by the touch operation, and transmits the signal to the touch controller. The touch controller receives touch information from the touch detection device, converts the touch information into a contact coordinate, and then transmits the contact coordinate to the processor 603 and can receive a command transmitted by the processor 603 and execute the command. Moreover, the touch-sensitive surface can be one of various types, such as a resistance type, a capacitance type, an infrared type, a surface acoustic wave type and the like. Besides the touch-sensitive surface, the input unit 602 can further include the other input devices. In detail, other input devices can include, but is not limited to, one or more of a physical keyboard, function keys (such as a volume control key, a switching key and the like), a trackball, a mouse, a joystick and the like.

The processor 603 is a control center of the computer device. The processor 603 is connected to various parts of the entire mobile phone by various interfaces and lines, and performs various functions of the computer device and processes data by running or executing software programs and/or modules stored in the memory 601 and invoking data stored in the memory 601, thereby monitoring the mobile phone as a whole. Alternatively, the processor 603 may include one or more processing cores. Preferably, the processor 603 may integrate an application processor and a modem processor, where the application processor mainly processes an operating system, a user interface, a computer program, and the like, and the modem processor mainly processes wireless communication. It should be understood that the modulation/demodulation processor can be independent from the processor 603.

The computer device further includes a power supply 604 (such as a battery) for supplying power to the respective components. Preferably, the power supply may be logically connected to the processor 603 by the power supply management system, so that functions such as charging, discharging, and power consumption management are managed by the power supply management system. The power supply 604 may further include one or more direct current (DC)/or alternating current (AC) power sources, recharging system, power failure detection circuit, power converter or inverter, power supply status indicator, and the like.

Although not shown, the computer device may further include a camera, a BLUETOOTH module, and so on, which are not repeated herein. In the present embodiment, the processor 603 in the computer device may load executable files corresponding to processes of one or more computer programs into the memory 601 according to the following instructions, and the processor 603 executes the computer programs stored in the memory 601 to implement various functions including:

receiving a device capability request transmitted by a hub node that has established a connection relationship with a target controlled device, where the target controlled device and the hub node belong to different Internet of Things systems; responsive to the device capability request, returning device capability information of the target controlled device to the hub node, where the device capability information is configured to instruct the hub node to generate device control information for the target controlled device; receiving device control information transmitted by the hub node; and setting authority information of the hub node for the target controlled device based on the device control information.

Alternatively, the various functions include:

obtaining device capability information of a target controlled device that has established a connection relationship with a hub node; generating device control information of the hub node for the target controlled device based on the device capability information; and transmitting the device control information to the target controlled device, where the device control information is configured to instruct the target controlled device to set a control authority, the control authority being a device control authority of the hub node for the target controlled device.

Implementation of above operations may refer to above embodiments, and is not repeated herein.

As can be seen from the above that the computer device according to the present embodiment can enable the hub node of the different Internet of Things system than the Internet of Things system to which the target controlled device belongs to set the device control authority of the hub node for the target controlled device, thereby implementing device control in a scenario across the Internet of Things systems. Specifically, the computer device of the present embodiment establishes a connection relationship between the target controlled device and the hub node, so that the hub node can obtain the device capability information of the target controlled device based on the connection relationship, generate device control information for setting the authority information, and set the device control authority of the hub node for the target controlled device with the device control information. As such, the computer device of the present embodiment can support that the target controlled device is controlled by a local hub device such as a third-party application, an intelligent sound box, a gateway, an intelligent television, or a router, so that the interconnection and intercommunication between the target controlled devices across the Internet of Things systems are improved.

In addition, compared with the protocol interconnection or standardization between one cloud and another cloud or between an end and one cloud, the computer device according to the present embodiment avoids the problem that the performance and the stability of the protocol interconnection or standardization between one cloud and another cloud are not high due to the long data link, and improves the problem that the device manufacturer of the protocol interconnection or standardization between an end and one cloud is less motivated and difficult to push because the target controlled device cannot access the cloud of the device manufacturer. Therefore, the computer device according to the present embodiment can further improve the interconnection and intercommunication between the target controlled devices across the Internet of Things systems without affecting the target controlled devices being connected to the cloud of the device manufacturer at a low cost.

A person of ordinary skill in the art may understand that all or some of the steps in various methods of the foregoing embodiments may be implemented by program instructions, or may be implemented by a program instructing relevant hardware. The program instructions may be stored in a computer readable storage medium, and be loaded and executed by a processor.

For this, another embodiment of the present application provides a storage medium, which stores a plurality of instructions that can be loaded by the processor to execute the steps of any of the methods provided in the embodiments of the present application. For example, the program instructions can perform following operations including:

receiving a device capability request transmitted by a hub node that has established a connection relationship with a target controlled device, where the target controlled device and the hub node belong to different Internet of Things systems; responsive to the device capability request, returning device capability information of the target controlled device to the hub node, where the device capability information is configured to instruct the hub node to generate device control information for the target controlled device; receiving device control information transmitted by the hub node; and setting authority information of the hub node for the target controlled device based on the device control information.

Alternatively, the program instructions can perform following operations including:

obtaining device capability information of a target controlled device that has established a connection relationship with a hub node; generating device control information of the hub node for the target controlled device based on the device capability information; and transmitting the device control information to the target controlled device, where the device control information is configured to instruct the target controlled device to set a control authority, the control authority being a device control authority of the hub node for the target controlled device.

Implementation of above operations may refer to above embodiments, and is not repeated herein.

The storage medium may include a Read Only Memory (ROM), a Random Access Memory (RAM), a magnetic disk, an optical disk, or the like.

Since the computer program stored in the storage medium can perform the steps in any of the methods provided in the embodiments of the present application, the advantageous effects achieved by the method provided in the embodiments of the present application can be realized. Please refer to the foregoing embodiments, of which details are not repeatedly described herein.

According to one aspect of the present application, a computer program product or a computer program is provided, including a computer instruction stored in a computer readable storage medium. A processor of a computer device reads the computer instruction from the computer readable storage medium and executes the computer instruction to cause the computer device to perform any of the methods provided in the various alternative implementations described in the embodiments of the present application.

The method and apparatus for setting the device control authority, the computer device, and the storage medium provided in the embodiments of the present application are described in detail above. A specific example is used herein to describe a principle and an implementation of the present application. The description of the foregoing embodiments is merely used to help understand a method and a core idea of the present application. In addition, an ordinary person skilled in the art may make changes in a specific implementation manner and an application scope according to an idea of the present application. In conclusion, content of this specification should not be construed as a limitation on the present application.

What is claimed is:

1. A method for setting a device control authority, comprising:
   receiving a device capability request transmitted by a hub node that has established a connection relationship with a target controlled device, wherein the target controlled device and the hub node belong to different Internet of Things systems;
   responsive to the device capability request, returning device capability information of the target controlled device to the hub node, wherein the device capability information is configured to instruct the hub node to generate device control information for the target controlled device;
   receiving device control information transmitted by the hub node, wherein the device control information comprises a system identification of a target Internet of Things system, an object identification of a device control object, and object attribute information of the device control object, the target Internet of Things system is an Internet of Things system to which the hub node belongs, and the device control object is an object that controls the target controlled device via the hub node;
   determining a service calling authority of the device control object for the target controlled device based on the object attribute information, wherein the service calling authority is a calling authority of the device control object to a service provided by the target controlled device, and the service provided by the target controlled device is determined based on the device capability information of the target controlled device; and
   in response to the object attribute information indicating that the device control object has an information chang-
   ing authority for the target controlled device, setting a device control authority of the device control object in the target Internet of Things system for the target controlled device based on the information changing authority and the service calling authority, wherein the information changing authority represents a changing authority of the device control object for the device control information stored in the target controlled device.

2. The method of claim 1, further comprising:
   receiving a device control instruction transmitted by the hub node, wherein the device control instruction is configured for the hub node to perform device control for the target controlled device; and
   executing an operation corresponding to the device control instruction;
   wherein the device control instruction comprises an information changing instruction;
   the executing of the operation corresponding to the device control instruction comprises:
   determining a device control object corresponding to the device control instruction; and
   in response to the device control object having an information changing authority for the target controlled device, executing an information changing operation corresponding to the information changing instruction.

3. A method for setting a device control authority, comprising:
   obtaining device capability information of a target controlled device that has established a connection relationship with a hub node;
   generating device control information of the hub node for the target controlled device based on the device capability information;
   transmitting the device control information to the target controlled device, wherein the device control information is configured to instruct the target controlled device to set a control authority, the control authority being a device control authority of the hub node for the target controlled device; and
   transmitting a device control instruction to a second cloud server, so that the second cloud server transmits the device control instruction to the target controlled device, wherein the second cloud server is a cloud server matched with the hub node.

4. The method of claim 3, wherein the generating of the device control information of the hub node for the target controlled device based on the device capability information comprises:
   determining a device control object of the hub node, wherein the device control object is an object that controls the target controlled device via the hub node; and
   generating device control information of the device control object in a target Internet of Things system for the target controlled device based on the device capability information, wherein the target Internet of Things system is an Internet of Things system to which the hub node belongs.

5. The method of claim 4, wherein the generating of the device control information of the device control object in the target Internet of Things system for the target controlled device based on the device capability information comprises:
   determining a service provided by the target controlled device based on the device capability information;

determining service accessing information of the device control object to the service; and generating device control information of the device control object in the target Internet of Things system for the target controlled device based on the service accessing information, comprising:

determining object attribute information of the device control object; and generating device control information of the device control object in the target Internet of Things system for the target controlled device based on the object attribute information.

6. The method of claim 3, wherein the hub node comprises a configuration device and an access management device, and the configuration device has established a connection relationship with the target controlled device;

transmitting the device control information to the target controlled device comprises:

establishing an access connection relationship between the access management device and the target controlled device via the configuration device, comprising:

transmitting communication address information of the access management device to the target controlled device via the configuration device; and establishing the access connection relationship between the access management device and the target controlled device based on the communication address information; and transmitting the device control information to the target controlled device based on the access connection relationship.

7. The method of claim 6, wherein the transmitting of the communication address information of the access management device to the target controlled device via the configuration device comprises:

triggering the configuration device to transmit the communication address information to the target controlled device; or transmitting device verification information of the access management device to the target controlled device via the configuration device, wherein the device verification information is configured for the target controlled device to verify the access management device; and transmitting communication address information of the access management device to the target controlled device based on the device verification information, comprising:

receiving device finding information transmitted by the target controlled device based on the device verification information; and generating response information for the device finding information to transmit the response information to the target controlled device, wherein the response information includes connection verification information and communication address information of the access management device.

8. The method of claim 6, wherein the transmitting of the device control information to the target controlled device based on the access connection relationship comprises:

authenticating the target controlled device based on the access connection relationship; and in response to the authentication being passed, transmitting the device control information to the target controlled device.

9. The method of claim 8, wherein the hub node further comprises an access authentication device;

the authenticating of the target controlled device comprises:

authenticating the target controlled device via the access authentication device.

10. The method of claim 8, further comprising: before the transmitting of the device control information to the target controlled device, determining device authentication information of the access management device, wherein the device authentication information is configured for the target controlled device to authenticate the access management device; and transmitting the device authentication information to the target controlled device.

11. The method of claim 10, wherein the determining of the device authentication information of the access management device comprises:

obtaining an authentication request transmitted by the target controlled device; and generating device authentication information of the access management device based on the authentication request.

12. The method of claim 11, wherein the hub node further comprises an access authentication device;

the generating of the device authentication information of the access management device based on the authentication request comprises:

transmitting the authentication request to the access authentication device; and triggering the access authentication device to generate device authentication information of the access management device based on the authentication request.

13. The method of claim 8, wherein the transmitting of the device control information to the target controlled device comprises:

in response to the authentication being passed, receiving device information transmitted by the target controlled device to perform device registration with the target controlled device based on the device information; and transmit device control information to the target controlled device based on a registration result.

14. The method of claim 3, further comprising:

transmitting a device control instruction to the target controlled device to perform device control for the target controlled device via the device control instruction.

15. A computer device, comprising: a memory storing a computer program; and a processor, wherein the processor is configured to perform the computer program in the memory to perform the method of claim 1.

16. A non-transitory computer readable storage medium storing a computer program which, when executed by a processor, causes the processor to perform the method of claim 1.

17. A computer device, comprising: a memory storing a computer program; and a processor, wherein the processor is configured to perform the computer program in the memory to perform the method of claim 3.

18. A non-transitory computer readable storage medium storing a computer program which, when executed by a processor, causes the processor to perform the method of claim 3.

* * * * *